(12) United States Patent
Imagawa et al.

(10) Patent No.: US 7,130,487 B1
(45) Date of Patent: Oct. 31, 2006

(54) SEARCHING METHOD, SEARCHING DEVICE, AND RECORDED MEDIUM

(75) Inventors: Taro Imagawa, Hirakata (JP); Yoshihiko Matsukawa, Ikoma (JP); Kenji Kondo, Hirakata (JP); Tsuyoshi Mekata, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/868,554

(22) PCT Filed: Dec. 15, 1999

(86) PCT No.: PCT/JP99/07050

§ 371 (c)(1),
(2), (4) Date: Sep. 14, 2001

(87) PCT Pub. No.: WO00/36530

PCT Pub. Date: Jun. 22, 2000

(30) Foreign Application Priority Data

Dec. 15, 1998 (JP) ............................... 10/355657
Aug. 25, 1999 (JP) ............................... 11/238053

(51) Int. Cl.
*G06K 9/36* (2006.01)
(52) U.S. Cl. ............... 382/280; 382/177; 382/187; 382/190; 707/4
(58) Field of Classification Search ............ 382/181, 382/187, 190, 195, 209, 218, 229, 230, 289, 382/177, 305; 707/4
See application file for complete search history.

(56) References Cited

U.S. PATENT DOCUMENTS

| | | | | |
|---|---|---|---|---|
| 5,625,710 A | * | 4/1997 | Katsuyama et al. | 382/209 |
| 5,825,926 A | * | 10/1998 | Tanaka | 382/229 |
| 5,883,588 A | * | 3/1999 | Okamura | 341/5 |
| 6,035,063 A | * | 3/2000 | Nakashima et al. | 382/187 |
| 6,097,841 A | * | 8/2000 | Gunji et al. | 382/229 |
| 6,272,242 B1 | * | 8/2001 | Saitoh et al. | 382/187 |
| 6,285,786 B1 | * | 9/2001 | Seni et al. | 382/187 |
| 6,332,046 B1 | * | 12/2001 | Fujimoto et al. | 382/289 |
| 6,470,336 B1 | * | 10/2002 | Matsukawa et al. | 707/4 |

(Continued)

FOREIGN PATENT DOCUMENTS

JP  60-95690  5/1985

(Continued)

OTHER PUBLICATIONS

"Full-text Search Methods for OCR-recognized Japanese Text with Misrecognized Characters", Manabu, Ohta, et al., Journal of the Information Processing Society of Japan, vol. 39, No. 3, Mar. 15, 1998, pp. 625-635.

(Continued)

*Primary Examiner*—Matthew C. Bella
*Assistant Examiner*—Gregory Desire
(74) *Attorney, Agent, or Firm*—Snell & Wilmer LLP

(57) ABSTRACT

The present invention relates to a retrieval method for searching a first character element string obtained by subjecting a character string to character recognition for a second character element string. The first character element string includes a first character element and the second character element string includes a second character element. A distance relevant to a similarity between the first character element and the second character element is predetermined between the first character element and the second character element. The retrieval method comprises the steps of comparing the distance with a predetermined reference distance, and determining whether the second character element matches the first character element based on a result of the comparison of the distance with the predetermined reference distance.

16 Claims, 20 Drawing Sheets

U.S. PATENT DOCUMENTS

| | | | |
|---|---|---|---|
| 6,512,851 B1 * | 1/2003 | Navoni et al. | 382/229 |
| 6,519,363 B1 * | 2/2003 | Su et al. | 382/177 |
| 6,636,636 B1 * | 10/2003 | Takasu | 382/230 |
| 6,718,060 B1 * | 4/2004 | Yokota et al. | 382/187 |
| 6,721,463 B1 * | 4/2004 | Naoi et al. | 382/305 |
| 6,751,605 B1 * | 6/2004 | Gunji et al. | 707/1 |
| 6,850,645 B1 * | 2/2005 | Naoi et al. | 382/190 |
| 6,859,515 B1 * | 2/2005 | Schultz et al. | 378/34 |
| 6,859,556 B1 * | 2/2005 | Takebe et al. | 382/218 |
| 6,944,344 B1 * | 9/2005 | Imagawa et al. | 382/229 |
| 2002/0154817 A1 * | 10/2002 | Katsuyama et al. | 382/190 |

FOREIGN PATENT DOCUMENTS

| | | |
|---|---|---|
| JP | 2-108157 | 4/1990 |
| JP | 04-225471 | 8/1992 |
| JP | 6-75996 | 3/1994 |
| JP | 6-149812 | 5/1994 |
| JP | 6-215184 | 8/1994 |
| JP | 9-44605 | 2/1997 |

OTHER PUBLICATIONS

"Reduction of Expanded Search Terms for Fuzzy English-text Retrieval", Manabu Ohta, et al., Technical Report of the Institute of Electronics, Information and Communication Engineers (DE98-9), vol. 98, No. 42, May 13, 1998, pp. 63-70.

"Evaluation of Information Retrieval Method based on 'non-deterministric text' of Character Recognition", Technical Report of the Information Processing Society of Japan (95-FI-39-9), vol. 95, No. 87, Sep. 14, 1995, pp. 65-72.

* cited by examiner

*FIG.2*

| | 亜 | 唖 | 彡 | 卩 | 〇〇 |
|---|---|---|---|---|---|
| 亜 | | 10 | 132 | 166 | 172 |
| 唖 | | | 115 | 152 | 164 |
| 彡 | | | | 143 | 191 |
| 卩 | | | | | 69 |
| 〇〇 | | | | | |

| Original document | ････日本の人口構成は････ |
|---|---|
| Character recognition result | ････日木の人区構成は････ |

| | | |
|---|---|---|
| Original document | · · · · | 日 本 の 人 口 構 成 は · · · · |
| Document data (recognition result) | · · · · | 日 本 の 人 区 構 成 は · · · · |
| Recognition reliability | | 0.9 0.6 0.8 0.9 0.4 0.8 0.9 0.7 |
| Reference distance | | 10 60 20 10 |
| Search keyword | | 人 口 構 成 |

|   | 人 | 口 | 構 | 成 | 区 | 同 |
|---|---|---|---|---|---|---|
| 人 | 0 | 170 | 250 | 210 | 99 | 113 |
| 口 | 170 | 0 | 244 | 168 | 50 | 100 |
| 構 | 250 | 244 | 0 | 142 | 198 | 184 |
| 成 | 210 | 168 | 142 | 0 | 137 | 152 |

FIG.7

|   | 亜 | 唖 | 彡 | 口 | 00 |
|---|---|---|---|---|----|
| 亜 |   | 12 | 130 | 170 | 168 |
| 唖 |   |   | 114 | 150 | 170 |
| 彡 |   |   |   | 147 | 190 |
| 口 |   |   |   |   | 60 |
| 00 |   |   |   |   |   |

|   | 林 | ∞ | ビ1 | 111 | 川 |
|---|---|---|---|---|---|
| 木木 | 10 | 221 | 190 | 156 | 152 |
| 川 | 155 | 165 | 91 | 9 |  |
| い | 201 | 119 | 13 | 89 | 95 |
| ロ | 149 | 188 | 98 | 133 | 137 |
| 00 | 215 | 12 | 105 | 169 | 172 |

FIG.10A

| | | T | | |
|---|---|---|---|---|
| 下 | Distance | 10 | 20 | 30 |
| | Frequency of occurrence (probability) | 0.2 | 0.6 | 0.2 |

FIG.10B

| | | T | F | ト | Γ | 木 |
|---|---|---|---|---|---|---|
| 下 | Distance | 20 | 60 | 90 | 125 | 130 |
| | Variance | 10 | 10 | 30 | 25 | 20 |

FIG.10C

| | | T | F | ト | Γ | 木 |
|---|---|---|---|---|---|---|
| 下 | Minimum distance | 10 | 50 | 63 | 102 | 110 |
| | Maximum distance | 30 | 70 | 122 | 151 | 165 |

FIG.11

| | | | | | | | | |
|---|---|---|---|---|---|---|---|---|
| Original document | ・・・・ | 日 | 本 | の | 人 | 口 | 構 | 成 | は ・・・・ |
| Document data (recognition result) | ・・・・ | 日 | 木 | の | 人 | 区 | 構 | 成 | は ・・・・ |
| Recognition reliability | | 0.9 | 0.6 | 0.8 | 0.9 | 0.4 | 0.8 | 0.9 | 0.7 |
| Reference distance | | | | | 10 | 60 | 20 | 10 | |
| Frequency of occurrence | | | | | 0.9 | 0.1 | 0.9 | 0.9 | |
| Search keyword | | | | | 人 | 口 | 構 | 成 | |

FIG.15

| Recognition result | . . . . | 日 | 木 | の | 人 | 区 | 構 | 成 | は | . . . . |
|---|---|---|---|---|---|---|---|---|---|---|
| Candidate |  | 目 | 本 | @ | 入 | 凶 | 講 | 茂 | ほ |  |
| Candidate |  |  | 大 |  | ル | 図 |  | 感 | ぽ |  |
| Candidate |  |  |  |  |  | 口 |  |  |  |  |

| Paragraph number | Paragraph number having the possibility of being concatenated | Recognition·result in each paragraph |
|---|---|---|
| A | B,C | ‥‥‥日本の |
| B | C,D | 人口構成は‥‥ |
| C | D | する傾向‥‥ |
| D | | ‥‥‥‥‥ |

FIG.19

| Paragraph number | Recognition result in each paragraph | Location of paragraph | |
|---|---|---|---|
| | | X | Y |
| A | ·····日木の | 10 | 100 |
| B | 人口構成は··· | 100 | 100 |
| C | する傾向···· | 10 | 200 |
| D | ·········· | 100 | 200 |

FIG.20

| Character recognition result 1 | ···日本のする傾向　　··· |
|---|---|
| Character recognition result 2 | ···日本の人口構成は··· |

| Column number | Recognition result in each column |
|---|---|
| 1 | ℃℃℃ |
| 2 | 9 2 0 |
| 3 | 2 3 3 |
| 4 | 都阪戸 |
| 5 | 京大神 |

*FIG.22B*

| Row number | Recognition result in each row |
|---|---|
| 1 | 京都 29℃ |
| 2 | 大阪 32℃ |
| 3 | 神戸 30℃ |

*FIG.23*

| Original document | ・・・日本の人口構成は・・・ |
|---|---|
| Character recognition result | ・・・日木の人区構成は・・・ |

| Original document | ・・・・日本の人口構成は・・・・・・ |
|---|---|
| Character recognition result | ・・・・日木のする傾向・・・・・・・ |

FIG.26

| | | |
|---|---|---|
| Original document | ・・・ | オックスフォード大学は・・・ |
| Document data (recognition result) | ・・・ | オッタスフォード大学は・・・ |
| Recognition reliability | | 0.98  0.42  0.98  0.97  0.97  0.99  0.99  0.96 |
| Search word | | オックスフォード |

| The number of matching characters K \ The number of characters of word n | 1 | 2 | 3 | 4 | 5 | 6 | 7 | 8 | ... |
|---|---|---|---|---|---|---|---|---|---|
| 1 | 1.0 | 0.1 | 0.1 | 0.1 | 0.08 | 0.05 | 0.03 | 0.01 | |
| 2 | | 1.0 | 0.4 | 0.2 | 0.15 | 0.1 | 0.05 | 0.02 | |
| 3 | | | 1.0 | 0.6 | 0.4 | 0.3 | 0.2 | 0.1 | |
| 4 | | | | 1.0 | 0.8 | 0.7 | 0.4 | 0.4 | |
| 5 | | | | | 1.0 | 0.9 | 0.8 | 0.8 | |
| 6 | | | | | | 1.0 | 0.9 | 0.85 | |
| 7 | | | | | | | 1.0 | 0.9 | |
| 8 | | | | | | | | 1.0 | |

SEARCHING METHOD, SEARCHING DEVICE, AND RECORDED MEDIUM

This action is a national stage entry of PCT/JP99/070050 filed Dec. 15, 1999.

TECHNICAL FIELD

The present invention relates to a retrieval method, a retrieval device, and a recording medium for retrieving a character string, which matches a search keyword, from document data which is obtained by subjecting an original document to character recognition.

BACKGROUND ART

Japanese Laid-open Publication No. 7-152774, entitled "DOCUMENT SEARCHING METHOD AND DEVICE", discloses a conventional technique which is known as a technique for searching document data, which is obtained by subjecting a document to character recognition, for data relevant to a designated character string.

FIG. 23 shows a relationship between an original document and a result of character recognition in the original document. A result of character recognition is also referred to as a recognition result. In general, character recognition is adversely affected by the faintness, angle, style, size, and the like of characters printed on paper.

FIG. 23 shows an example in which a character "･木･" in the original document is incorrectly recognized as another character "木". Further, a character "･口･" in the original document is incorrectly recognized as another character "･区･".

Hereinafter, a process of searching the recognition result (FIG. 23) for a character string "･日本･" will be described based on the technique described in the above Japanese Laid-open Publication No. 7-152774.

This retrieval process uses a table (Table 1) indicating misrecognized characters. The table indicating misrecognized characters is a table which lists certain characters which tend to be incorrectly recognized by character recognition. Table 1 shows that a character "木" tends to be incorrectly recognized as "･木･", "･大･", "太", or "才" and that a character "口" tends to be incorrectly recognized as "囗 (symbolic quadrangle)", "回", "円", or "夕".

TABLE 1

| Subject Character | Misrecognized characters |
|---|---|
| 木 | 朩, 木, 朩, 才 |
| 口 | 口, 圉, 円, 夕 |

When searching the recognition result of FIG. 23 for a character string "日本", character strings "日木", "日大", "日太", and "日才" are produced based on the character string "日 本" using the table (Table 1) indicating misrecognized characters. In addition to the designated character string "日本", the character strings "日木", "日大", "日太", and "日才" are searched for. Therefore, "日木" for which "日本" has been incorrectly recognized can be retrieved.

However, in the retrieval process described in the above Japanese Laid-open Publication No. 7-152774, a list of characters which tend to be incorrectly recognized is prepared in advance. Therefore, when searching data having few errors, an excessive amount of searching may be executed using excessive character candidates. Conversely, when searching document data having many errors, misrecognized characters other than those on the list may not be retrieved.

For example, in the example shown in FIG. 23, when the recognition result is searched for a character string "人口", the character strings "人口 (symbolic quadrangle)", "人国", "人円", and "人夕" are produced using a table (Table 1) indicating misrecognized characters. Each of the character strings are searched for. However, when an error (e.g., "･口･" is incorrectly recognized as "区" which is not listed in the table (Table 1) indicating misrecognized characters) occurs, it is not possible to retrieve "人区".

Further, when searching document data, which has been obtained by recognizing characters in a general document having a certain layout, for a character string, the layout might be incorrectly recognized (e.g., vertical writing is incorrectly recognized as horizontal writing or vice versa; a subsequent line to be concatenated after line feed is incorrectly recognized; the concatenation between such paragraph is incorrectly recognized; and the like). The recognition error of layouts cannot be addressed by the retrieval method described in the above Japanese Laid-open Publication No. 7-152774.

For example, a case where an original document having a layout shown in FIG. 24 is subjected to character recognition will be now discussed. In FIG. 24, the proper order of the paragraphs is an upper right paragraph, an upper left paragraph, a lower right paragraph, and a lower left paragraph. However, in the process of character recognition, the order of the paragraphs may be incorrectly recognized, so that the lower right paragraph is incorrectly concatenated with the upper right paragraph, for example.

In this case, when the recognition result is searched for a character string "日本の人口", it is possible to search for individual characters using a table indicating misrecognized characters, or the like. However, when the concatenation of paragraphs is incorrect, the recognition results in " . . . 日本のする傾向. . . " as shown in FIG. 25, for example. Therefore, the character string "日本の人口" cannot be retrieved.

The present invention is provided to resolve the above-described problems. The objectives of the present invention are:

(1) to provide a retrieval method in which a search can be performed while dynamically changing a tolerance level to recognition error depending on a recognition result, and a retrieval device and a recording medium; and (2) to provide a retrieval method in which a character string can be correctly retrieved from a recognition result even when the layout of a document is incorrectly recognized, and a retrieval device and a recording medium.

DISCLOSURE OF THE INVENTION

A retrieval method of the present invention is provided for searching a first character element string obtained by subjecting a character string to character recognition for a second character element string. The first character element string includes a first character element and the second character element string includes a second character element. A distance relevant to a similarity between the first character element and the second character element is predetermined between the first character element and the second character element. The retrieval method comprises the steps of comparing the distance with a first predetermined reference distance, and determining whether the second character element matches the first character element based on a result of the comparison of the distance with the first predetermined reference distance. Therefore, the above-described objective is achieved.

For the first character element, a reliability of character recognition may be predetermined, and the first predetermined reference distance may be determined based on the reliability.

The predetermined first reference distance may be determined based on user input.

The retrieval method may further comprises the steps of changing the first predetermined reference distance to a second reference distance, comparing the distance with the second reference distance, and determining whether the second character element matches the first character element based on a result of the comparison of the distance with the second reference distance.

A plurality of distances relevant to the similarity between the first character element and the second character element may be predetermined between the first character element and the second character element, and one distance selected from the plurality of distances may be used as the distance.

The one of the plurality of distances may be determined based on user input.

The distance may have a probabilistic distribution.

Another retrieval method of the present invention is provided for searching a first character element string obtained by subjecting a character string to character recognition for a second character element string. The first character element string includes a plurality of character elements. For a specific character element of the plurality of character elements, a plurality of character elements having the possibility of being concatenated with the specific character element are predetermined. The retrieval method comprises the steps of determining whether a character element string obtained by concatenating the specific character element of the plurality of character elements with one character element of the plurality of character elements, the one character element being different from the specific character element, matches at least a part of the second character element string. Therefore, the above-described objective is achieved.

The retrieval method may comprise the steps of selecting one character element from the plurality of character elements having the possibility of being concatenated with the specific character element, and determining whether a character element string obtained by concatenating the specific character element with the selected character element matches at least a part of the second character element string.

The specific character element may be located at an end of a row or column, the plurality of character elements having the possibility of being concatenated with the specific character element are each located at a head of a row or column.

The specific character element and one of the plurality of character elements having the possibility of being concatenated with the specific character element may be located at the same row or column. The specific character element and another one of the plurality of character elements having the possibility of being concatenated with the specific character element may be located at different rows or columns and at the same column or row.

Another retrieval method of the present invention is provided for searching a first character element string obtained by subjecting a character string to character recognition for a second character element string. The first character element string includes at least one first character element and the second character element string includes at least one second character element. The retrieval method comprises the steps of obtaining a probability that a search result matches the second character element string, based on the number of the second character elements included in the second character element string, and a number of the second character elements matching the corresponding first character elements out of the second character elements included in the second character element string, and determining the correctness of the search result based on the probability. Therefore, the above-described objective is achieved.

A distance relevant to a similarity between the first character element and the second character element may be predetermined between the second character element and the corresponding first character element. The retrieval method may further comprises the steps of comparing the distance with a predetermined reference distance, and determining whether the second character element matches the corresponding first character element based on a result of the comparison of the distance with the predetermined reference distance.

The retrieval method may further comprise the step of for a second character element out of the at least one second character element included in the second character element string, said second character element not matching a corresponding first character element included in the first character element string, after resetting a predetermined reference distance, determining whether said second character element matches the corresponding first character element using the reset predetermined reference distance.

The retrieval method may further comprise the step of dividing the second character element string into a plurality of character element portions.

A retrieval device of the present invention is provided for searching a first character element string obtained by subjecting a character string to character recognition for a second character element string. The first character element string includes a first character element and the second character element string includes a second character element. A distance relevant to a similarity between the first character element and the second character element is predetermined between the first character element and the second character element. The retrieval device comprises means for comparing the distance with a predetermined reference distance, and means for determining whether the second character element matches the first character element based on a result of the comparison of the distance with the predetermined reference distance. Therefore, the above-described objective is achieved.

Another retrieval device of the present invention is provided for searching a first character element string obtained by subjecting a character string to character recognition for a second character element string. The first character element string includes a plurality of character elements. For a specific character element of the plurality of character elements, a plurality of character elements having the possibility of being concatenated with the specific character element are predetermined. The retrieval device comprises means for determining whether a character element string obtained by concatenating the specific character element of the plurality of character elements with one character element of the plurality of character elements, the one character element being different from the specific character element, matches at least a part of the second character element string. Therefore, the above-described objective is achieved.

Another retrieval device of the present invention is provided for searching a first character element string obtained by subjecting a character string to character recognition for a second character element string. The first character element string includes at least one first character element and the second character element string includes at least one second character element. The retrieval device comprises means for obtaining a probability that a search result matches the second character element string, based on the number of the second character elements included in the second character element string, and a number of the second character elements matching the corresponding first character elements out of the second character elements included in the second character element string, and means for determining the correctness of the search result based on the probability. Therefore, the above-described objective is achieved.

A computer readable recording medium of the present invention is provided in which a program for causing a computer to execute a retrieval process for searching a first character element string obtained by subjecting a character string to character recognition for a second character element string is recorded. The first character element string includes a first character element and the second character element string includes a second character element. A distance relevant to a similarity between the first character element and the second character element is predetermined between the first character element and the second character element. The retrieval process comprises the steps of comparing the distance with a predetermined reference distance, and determining whether the second character element matches the first character element based on a result of the comparison of the distance with the predetermined reference distance. Therefore, the above-described objective is achieved.

Another computer readable recording medium of the present invention is provided in which a program for causing a computer to execute a retrieval process for searching a first character element string obtained by subjecting a character string to character recognition for a second character element string is recorded. The first character element string includes a plurality of character elements. For a specific character element of the plurality of character elements, a plurality of character elements having the possibility of being concatenated with the specific character element are predetermined. The retrieval process comprises the steps of determining whether a character element string obtained by concatenating the specific character element of the plurality of character elements with one character element of the plurality of character elements, the one character element being different from the specific character element, matches at least a part of the second character element string. Therefore, the above-described objective is achieved.

Another computer readable recording medium of the present invention is provided in which a program for causing a computer to execute a retrieval process for searching a first character element string obtained by subjecting a character string to character recognition for a second character element string is recorded. The first character element string includes at least one first character element and the second character element string includes at least one second character element. The retrieval process comprising the steps of obtaining a probability that a search result matches the second character element string, based on the number of the second character elements included in the second character element string, and a number of the second character elements matching the corresponding first character elements out of the second character elements included in the second character element string, and determining the correctness of the search result based on the probability. Therefore, the above-described objective is achieved.

BRIEF DESCRIPTION OF THE DRAWINGS

FIG. 2 is a diagram showing an exemplary table indicating distances between character elements.

FIG. 3A is a diagram showing an exemplary character element consisting of one character radical.

FIG. 3B is a diagram showing an exemplary character element consisting of one character and one character radical.

FIG. 4 is a diagram showing a relationship between an original document and a recognition result obtained by subjecting the original document to character recognition.

FIG. 7 is a diagram showing an exemplary distance table prepared for a font type "Mincho font".

FIG. 8A is a diagram showing an example of a recognition error in which a plurality of character elements are recognized as a single character element.

FIG. 8B is a diagram showing an example of a recognition error in which a single character element is recognized as a plurality of character elements.

FIG. 9 is a diagram showing an exemplary character element distance table including the character elements shown in FIGS. 8A and 8B.

FIG. 10A is a diagram showing an exemplary distance table including the frequency of occurrence of a character element.

FIG. 10B is a diagram showing another exemplary distance table including the frequency of occurrence of a character element.

FIG. 10C is a diagram showing another exemplary distance table including the frequency of occurrence of a character element.

FIG. 11 is a diagram showing an exemplary relationship among the reliability of character recognition, a reference distance, and the frequency of occurrence.

FIG. 15 is a diagram showing an example in which candidates of the recognition result, are additionally provided.

FIG. 19 is a diagram showing an exemplary table indicating a concatenation relationship between paragraphs in a recognition result.

FIG. 20 is a diagram showing an exemplary recognition result obtained by subjecting an original document to character recognition.

FIG. 21 is a diagram showing an exemplary original document having a layout in the form of horizontal writing.

FIG. 22A is a diagram showing a table indicating a recognition result of character recognition under an assumption that an original document is in the form of vertical writing.

FIG. 22B is a diagram showing a table indicating a recognition result of character recognition under an assumption that an original document is in the form of horizontal writing.

FIG. 23 is a diagram showing a relationship between an original document and a recognition result obtained by subjecting the original document to character recognition.

FIG. 26 is a diagram used for explaining a retrieval process for searching a recognition result for a search word.

FIG. 27 is a diagram showing an exemplary probability table.

BEST MODE FOR CARRYING OUT THE INVENTION

Hereinafter, the present invention will be described by way of illustrative examples with reference to the accompanying drawings.

Figure 1:
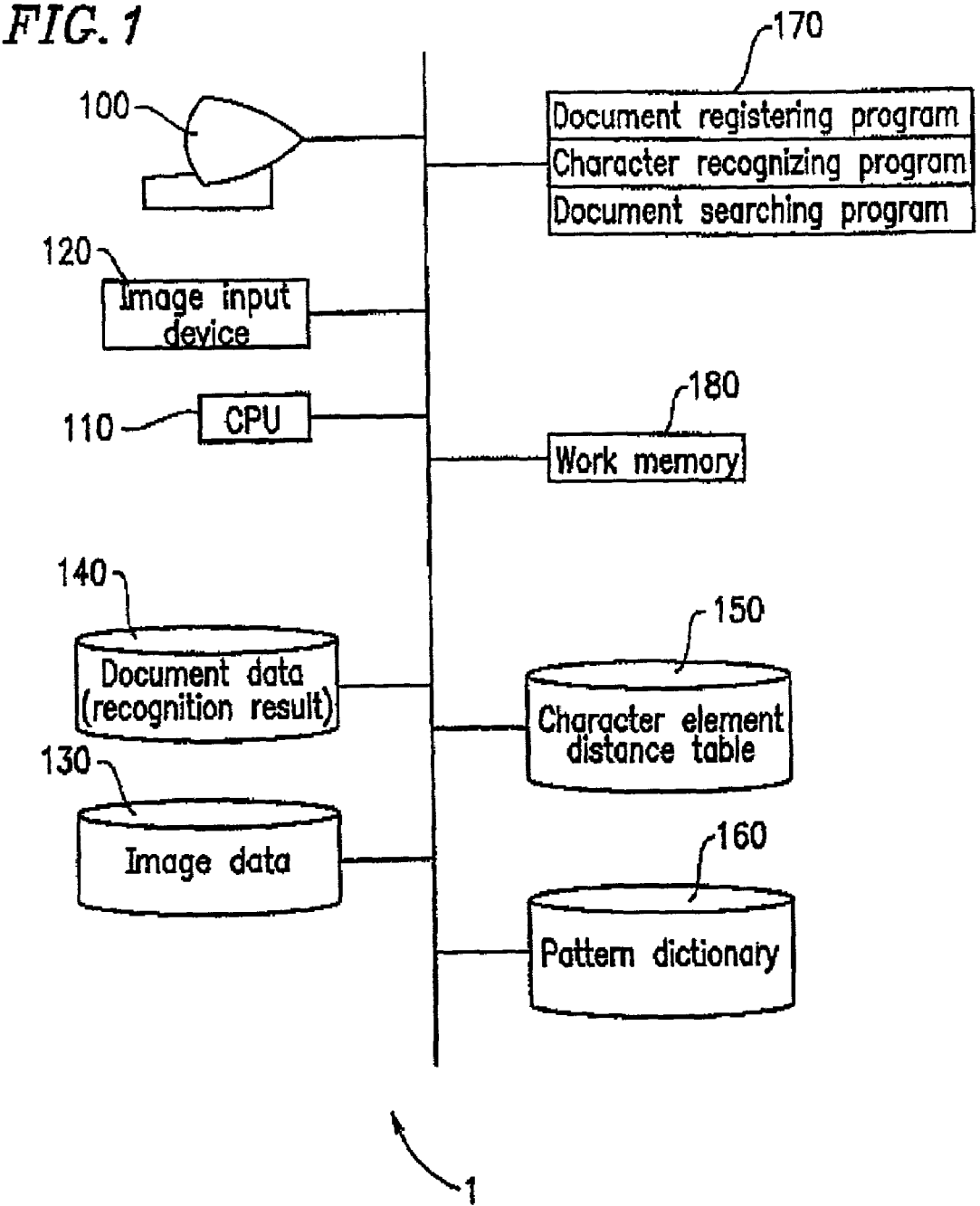
FIG. 1 is a block diagram showing a retrieval device 1 shared by Examples 1 through 14 of the present invention.

FIG. 1 shows a configuration of a retrieval device 1 which is used in Examples 1 to 14 of the present invention.

The retrieval device 1 includes: a terminal 100; a CPU 110 for executing a registration process and a retrieval process; an image input device 120 for inputting a document as image data; a memory 130 for storing the image data: a memory 140 for storing document data (recognition result) obtained by subjecting the image data to character recognition; a memory 150 for storing a table indicating a distance between each character element (hereinafter also referred to as a character element distance table); a character recognition pattern dictionary 160; a memory 170 for storing a document registering program, a character recognition program, and a document searching program; and a working memory 180.

Each component of the retrieval device 1 may be connected with each other via an internal bus or a network.

First, a flow of the registration process will be described below.

A user provides an instruction to start the registration process through the terminal 100. Then, the document registering program in the memory 170 is started and loaded into the working memory 180. The CPU 110 executes the document registering program. As a result, the image input device 120 reads the document as image data. The image data is then stored in the memory 130. The image input device 120 is, for example, a scanner, a digital camera, or a video camera.

The document registering program starts the character recognition program in the memory 170. The character recognition program is then loaded into the working memory 180. The CPU 110 executes the character recognition program. As a result, the image data stored in the memory 130 is read out. The character information included in the image data is converted into a character code string, so that document data (recognition result) is obtained. The document data (recognition result) is stored in the memory 140. The conversion of the character information included in the image data into a character code string is performed with reference to the character recognition pattern dictionary 160.

Any algorithm which performs character recognition may be used. In an exemplary algorithm of the character recognition program, image data may be extracted on a word-by-word basis and the extracted one-word image data may be converted into a character code.

A flow of the retrieval process will be described below.

A user enters a search keyword through the terminal 100 and provides an instruction to start the retrieval process. The document searching program in the memory 170 is started and loaded into the working memory 180. The CPU 110 executes the document searching program. As a result, whether a character element string corresponding to the search keyword exists in the document data (recognition result) is determined using the distance table stored in the memory 150. A result of the search is displayed on the terminal 100. The image data corresponding to the search result may be displayed on the terminal 100.

Example 1

FIG. 2 shows an exemplary character element distance table stored in the memory 150. The character element distance table provides numerical values representing a relationship (close or distant) between each character element.

The term "character element" as herein used refers to one or more characters, one or more character radicals, or a combination of one or more characters and one or more character radicals.

For example, "重" is a character element consisting of one character. "0 0" is a character element consisting of two characters.

The term "character radical" refers to a part of a character. For example, a character radical corresponds to the left or right side of a Japanese Kanji character. FIG. 3A shows an exemplary character element consisting of one character radical. FIG. 3B shows an exemplary character element consisting of one character and one character radical.

It should be noted that characters include symbols such as ")" and "◎".

The distance table of FIG. 2 provides predetermined distances between character elements. The distance relates to a similarity between each character element. The greater the distance, the lesser the similarity. The lesser the distance, the greater the similarity. Therefore, the similarity between each character element is an inverse of the distance between each character element.

In the example of FIG. 2, a distance between a character element "亜" and a character element "唖" is set to 10. A distance between the character element "亜" and a character element "0 0" is set to 172. This means that the character element "亜" is more similar to the character element "唖" than to the character element "0 0". Distances between other character elements are similarly predetermined.

The distances can take arbitrary values which are relevant to the similarities between character elements. For example, the distances may take input-output relationships of a specific character recognition system, Euclid distances in a feature quantity space where the shapes of individual character elements are represented by numerical values of feature quantities, or the like.

It should be noted that the distances between character elements may not be necessarily represented by a table in the form of a matrix as shown in FIG. 2. The distances between character elements can be represented by any form as long as the distances are relevant to the similarities between character elements. For example, character elements may be listed in the distance table in such a manner that for each character element, the other character elements are arranged in ascending order of distance. The order itself may be regarded as a distance.

Hereinafter, a description will be given of a retrieval method using a table indicating distances between character elements.

FIG. 4 shows a relationship between an original document and a recognition result obtained by subjecting the original document to character recognition. In the example of FIG. 4, an original document containing the character string " . . . 日本の人口構成は . . . " is subjected to character recognition, resulting in " . . . 日木の人区構成は . . . " being recognized (recognition result). The recognition result is stored in the memory 140 as document data. The memory 140 may be a storage medium of any type.

In general, character recognition is performed using character recognition technology, errors occur in the character recognition due to various factors. In the example of FIG. 4, a character "・木・" is incorrectly recognized as a character "木" and a character "・口・" is incorrectly recognized as a character "・区・".

It is now assumed that a character element string "・日本・" is designated as a search keyword, and the recognition result of FIG. 4 is searched for a character element string corresponding to the search keyword. This retrieval process will be described below. The retrieval process is executed by the CPU 110 in accordance with the document searching program.

First, the character element distance table is referenced with respect to the character element "日" of the designated character element string "日本". Thereafter, the recognition result of FIG. 4 is searched for character elements having a distance from "日" which is less than a predetermined reference distance (e.g., 150) (e.g., for the character element "日", the character element "日" and a character element "目" are searched for). In this case, the character element "日" is detected as a result of the search.

Thereafter, the character element distance table is referenced with respect to the next character element "・本・" of the designated character element string "日本". Thereafter, it is determined whether any of the character elements having a distance from "・本・" which is less than a predetermined reference distance (e.g., 150) (e.g., for the character element "本", the character element "本", a character element "・木・", and a character element "大 " are searched for) matches the character element "木" positioned next to the detected character element "日 ". In this case, the character element "木" matches the character element positioned next to the detected character element "日 ". Therefore, for the designated character element string "日本", character element string "日木" can be detected in the recognition result of FIG. 4.

In this manner, even when the original character string "・日本・" has been incorrectly recognized as "日木", the original location of the character string can be detected.

In practical applications, it is preferable that when a designated character element string is detected, not only a detected character element string, but also the recognition results of sentences before and after the detected character element string, are presented. It is also preferable that an original document before character recognition is separately stored as document image data and a corresponding document image is presented to a searcher. Therefore, when a character recognition result is partially incorrect, a user also checks the original document so that the searcher can obtain required information.

Alternatively, when a designated character element string is detected in a document, the title or abstract of the document may be displayed in addition to sentences before and after the detected character element. In this case, it is possible to know a search result even in a small display space. Further, if audio as well as a display are used to output sentences before and after a detected character element string, a title, and an abstract, the display area of a terminal can be reduced. Further, a search result may be output via a communication path (network). When a search result is transferred via a communication path having a narrow band, the image of a document is not displayed from the beginning, but only a recognition result before and after a detected character element string, a title, and/or an abstract of a document are displayed at the beginning. An image having a large amount of information is optionally displayed by a searcher's instruction, thereby saving search time and/or reading time.

Further, when a designated character element string is detected, a new command may be issued to a device instead of presenting detected information. For example, an image obtained in real time from a camera or the like is searched. When a designated character element string (e.g., "レストラン (restaurant)") is detected, a command to store an image into a memory is issued to the device for taking images. Thereby, images of restaurants can be automatically collected.

When a designated character element string is detected, a command to print out an image including the designated character element string may be issued to a printer, or image information including the designated character element string may be distributed via a communication network to a plurality of addresses.

It should be noted that a reference distance, which is compared with distances between character elements, is not limited to a value of 150. A reference distance may be set to an arbitrary value. A reference distance does not necessarily need to be fixed, but may be variable. A reference distance may be determined based on an input by a user. A reference distance may be determined based on a result of operation executed by the CPU 110.

For example, a reference distance is set to a small value at the beginning. If a character element string corresponding to a search keyword cannot be detected in a recognition result, a reference distance may be reset to a sequentially increased value and a search is performed again. That is, a search is initially performed where the tolerance level to character recognition error is set to a low value, and thereafter the tolerance level to character recognition error is sequentially increased. Therefore, it is possible to prevent a character element string irrelevant to a search keyword from being detected due to a high tolerance level to character recognition error which is set at the beginning.

Further, the reliability (or likelihood, or accuracy, or probability, etc.,) of character recognition may be held as a search parameter along with document data (recognition result) obtained by subjecting an original document to character recognition. A reference value of distance for use in a search (reference distance) may be set to an appropriate value depending on the search parameter. The search parameter may be stored in the memory 140, for example.

Figures 5, 6:
FIG. 5 is a diagram showing an example in which the reliability of character recognition with respect to individual character elements included in document data (recognition result) is predetermined as a search parameter.
FIG. 6 is a diagram showing a distance relationship between each of the character elements "人", "口", "構", and "成" and some of the other character elements.

FIG. 5 shows an example in which a reliability of character recognition for each character element included in document data (recognition result) is predetermined as a search parameter. In this case, the reliability is represented by a value in the range from 0 to 1. A larger value of the reliability means a higher probability of a recognition result.

Hereinafter, description will be given of a retrieval process in which a character element string "人口構成" is designated as a search keyword and a recognition result shown in FIG. 5 is searched for a character element string corresponding to the search keyword. This retrieval process is executed by the CPU 110 in accordance with the document searching program.

FIG. 6 shows a distance relationship between each of the character elements "人", "口", "構", and "成" and some other character elements.

As shown in FIG. 5, the reliabilities of the character elements "人" and "成" in a recognition result are predetermined to be 0.9. For a character element having such a high predetermined reliability, a reference distance which is compared with distances between character elements is set to be a low value. For example, in the example of FIG. 5, for a character element having a reliability of 0.9, a reference distance is set to 10. For a character element "区" in the recognition result, a reliability is predetermined to be 0.4. Thus, for a character element having such a low predetermined reliability, a reference distance which is compared with distances between character elements is set to a high value. For example, in the example of FIG. 5, for a character element having a reliability of 0.4, the reference distance is set to 60.

In this manner, reference distances are varied depending on reliabilities of character recognition, thereby making it possible to improve the precision of the search. For example, the character element "区" in the recognition result, which is incorrect, has a low reliability, so that the reference distance thereof is set to a high value. Therefore, the character element "･口･" having a distance of 50 from the character element "区", is a subject to be searched for. As a result, when the character element string "人口構成" is designated, a character element string "人区構成" including a misrecognized character can be retrieved.

In this manner, for a character element or a document having a low reliability of character recognition, distances between character elements (reference distances) tolerable in the search are set to large values in a character element distance table. Conversely, for a character element or a document having a high reliability of character recognition, distances between character elements (reference distances) tolerable in the search are set to small values in the character element distance table. Therefore, it is possible to suppress detection of extra character elements irrelevant to a search keyword.

It should be noted that a correspondence between a value of a reliability and a tolerable distance (reference distance) in a character element distance table is predetermined.

Further, when a reliability of character recognition is significantly low, a retrieval process may be switched to another retrieval process in which all character elements can be searched for.

A search parameter (reliability) may be attached to each document or each character element. The reliability of character recognition may be an output of a character recognition system (e.g., a neural network) or the number of recognition candidates.

In Example 1, each character element included in the character element string designated as a search keyword is searched for sequentially from the leading character "人" on a character element-by-character element basis. The character elements may be searched for on a character element-by-character element basis in a different order. Particularly, the frequency of occurrence of each character element in a general document is considered. If the search is begun from a character element having a small frequency of occurrence in a general document out of character elements included in a character element string as a search keyword, excessive retrieval processes can be reduced, thereby increasing a search speed.

It should be noted that in Example 1, document data of a recognition result is assumed to be stored in a storage medium (a memory, a magnetic disk, an optical disk, etc.) in advance. Alternatively, image data input from an image input device (a scanner, a digital camera, a video camera, etc.) may be sequentially subjected to character recognition, and the resultant real-time information may be similarly searched.

In this manner, a character element string is searched for using a character element distance table, thereby making it possible to retrieve a character element string corresponding to a designated character element string from document data even when the designated character element string is replaced with a different character element string due to recognition error.

Further, by using a distance table, the need for complicated distance calculation is removed and a high-speed search can be achieved.

Further, by using a distance table, the tolerance level to recognition error can be set to an appropriate value, so that an efficient search is made possible.

Furthermore, search parameters (e.g., a reliability of character recognition) is attached to document data, thereby making it possible to select references or switch retrieval methods for the purpose of performing a search suited for document data or character elements. Therefore, the precision of the search can be improved.

Example 2

In Example 2, a plurality of distance tables are provided. That is, a plurality of distances are predetermined between character elements. The distances are relevant to similarities between character elements. One table is selected from the plurality of distance tables. The selected table is used to search for a character element string. Specifically, one of a plurality of distances predetermined between character elements is selected. Based on a comparison between the selected distance and a predetermined reference distance, whether a match or mismatch occurs between character elements is determined. One of a plurality of distances predetermined between character elements is selected in accordance with a user's input, for example.

It should be noted that a basic flow of a process for searching for a character element string is similar to that of Example 1.

A plurality of distance tables are, for example, provided for respective character recognition systems of a plurality of types. Alternatively, a plurality of distance tables are provided, respectively, for a plurality of character types (e.g., a Japanese Kanji character, the English alphabet, a Greek character, a Japanese Katakana character, etc.) or for a plurality of font types.

For example, FIG. 2 shows an exemplary distance table prepared for a font type "Gothic font", while FIG. 7 shows an exemplary distance table prepared for a font type "Mincho font".

One of a plurality of distance tables is selectively used depending on the document data to be searched. For example, an original document is subjected to character recognition. In the resultant document data, information, such as character types and font types included in the document data and the type of a character recognition system used in the character recognition, is held as search parameters, thereby making it possible to select an appropriate table when the search is performed. Therefore, the precision and speed of the search can be improved.

In the case where distance tables are switched depending on font types, document data obtained by subjecting an original document to character recognition is preferably provided with information indicating whether a font type is close to the Mincho font or the Gothic font, the information being attached to each character element as a search parameter. By referencing such a search parameter, distance tables are switched as follows. When document data including Gothic font character elements is searched for a character element string, a distance table as shown in FIG. 2 is used. When document data including Mincho font character elements is searched for a character element string, a distance table as shown in FIG. 7 is used. Information indicating font types can be obtained by recognizing font types while recognizing characters.

Further, a plurality of distance tables may be switched with respect to the same document data. In this case, document data from which a search character element string could not have been retrieved is searched again for the search character element using a different criterion. As a result, the precision of the search can be improved. Further, the image of a document corresponding to the location of a character element string detected by a retrieval process using a distance table may be subjected to character recognition with a higher level of precision. For example, rough, but high-speed searching is performed using a distance table to narrow the number of candidates. Thereafter, a search target can be confirmed using character recognition with a higher level of precision (a processing time is generally long). Therefore, both search precision and search speed can be improved.

In particular, when a character string having a small number of characters (two-character word) is searched for, it is highly possible that a similar character string is accidentally retrieved. Therefore, in such a situation, a search may be performed again using a different distance table depending on the number of character elements in a character string. Character recognition with a high level of precision may be also used. Therefore, a high precision search can be achieved without unnecessarily increasing the processing time.

Further, distance tables may be switched depending on the character type of a character element string designated as a search keyword. For example, when a character element string designated as a search keyword and document data only include English alphabet characters, a distance table for English alphabet characters is used, thereby making it possible to remove extra search processes.

It should be noted that in Example 2 a distance table is used to compensate for character recognition error in units of a character. However, a distance table may be used to compensate for character recognition error in units of one or more characters.

FIG. 8A shows an example of a recognition error in which a plurality of character elements are recognized as a single character element. In FIG. 8A, two characters "★" are incorrectly recognized as a single character "✹" and two characters "0" (zero) are incorrectly recognized as a single character "∞" (infinity).

FIG. 8B shows an example of a recognition error in which a single character element is incorrectly recognized as a plurality of character elements. In FIG. 8B, a single character "川" is incorrectly recognized as three characters "1" (one) and a single character "い" is incorrectly recognized as "し" and "1" (one).

If in a distance table, a distance between two characters "★" and a single character "✹", a distance between two characters "0" (zero) and a single character "∞" (infinity), a distance between a single character "川" and three characters "1" (one), and a distance between a single character "い" and two characters "し" and "1" (one) are set to be small values, a correct search result can be obtained in the case of recognition error as shown in FIGS. 8A and 8B.

FIG. 9 shows an exemplary character element distance table including the character elements shown in FIGS. 8A and 8B.

In the example of FIG. 9, a distance between two characters "★" and a single character "✹", a distance between two characters "0" (zero) and a single-character "∞" (infinity), a distance between a single character "川" and three characters "1" (one), and a distance between a single character "い" and two characters "し" and "1" (one) each are set to 13 or less. These distances are set to values considerably smaller than distances from other character elements (i.e., 98 or more).

For example, a character element string "1 0 0" is designated as a search keyword. A distance (reference distance) used as a reference for a tolerance level to recognition error is set to 50. In this case, after retrieving "1" a single character "∞" as well as two characters "0" can be searched for. Therefore, even if "1 0 0" is incorrectly recognized as "1∞", the character element string "1 0 0" as the search keyword can be retrieved.

Similarly, even if "いろり" is incorrectly recognized as "し1ろり", the character element string "いろり" as a search keyword can be retrieved.

Further, when an original document itself includes incorrect expressions due to errors such as Kana-Kanji conversion (e.g., "収める" is presented instead of "納める"), when there exists a plurality of Japanese Kana characters added to a Japanese Kanji character to show its Japanese inflection ("変わる" is presented instead of "変え"), when a word expressed in Japanese Kanji characters is searched for using Japanese Hiragana characters ("切磋" is searched for using "せっさ"), when a search is performed using a synonym ("価格" is searched for using "定価"), or when a different language is searched for ("h i s t o r y" is searched for using "歴史"), a distance between "収" and "納", a distance between "変わ" and "変え", a distance between "切磋" and "せっさ", a distance between "価格" and "定価", or a distance between "h i s t o r y" and "歴史" is respectively set to a small value. In this case, therefore, a correct search result can be obtained.

Example 3

In Example 3, the frequencies of occurrence of character elements are provided in a table indicating distances between character elements in addition to distances between character elements. Therefore, distances between character elements can be handled as if the distances have a probability distribution.

FIG. 10A shows an exemplary distance table including the frequency of occurrence. In FIG. 10A, for a character element "下", the frequency (probability) of occurrence of a character element "T" is 0.2 when a distance therebetween is 10, 0.6 when the distance is 20, and 0.2 when the distance is 30.

FIG. 10B shows another exemplary distance table including the frequency of occurrence. In the example of FIG. 10B, it is assumed that the frequency of occurrence complies with a normal distribution. The frequency of occurrence is represented by a distance and a variance. For example, FIG. 10B shows that for the character element "下", the character element "T" complies with a normal distribution around a distance of 20 having a variance of 10.

FIG. 10C shows another exemplary distance table including the frequency of occurrence. In the example of FIG. 10C, it is assumed that the frequency of occurrence complies with an uniform distribution. The frequency of occurrence is represented by the shortest distance and the greatest distance. For example, for the character element "下", a character element "F" complies with an uniform distribution in the distance range of 50 to 70, and a character element "ト" complies with an uniform distribution in the distance range of 63 to 122. Therefore, since the character element "F" and the character element "ト" overlap in the distance range of 63 to 70, the frequency of occurrence of each character element is determined to be 0.5.

As described above, the frequency of occurrence is included in the distance table as shown in FIGS. 10A through 10C. Therefore, a distance between each character element is not a fixed value, but can be handled as if the distance has a value having a certain range, i.e., a probability distribution. Therefore, a search can be performed depending on the frequencies of occurrence of the character elements.

Description will be given of a retrieval process in which a character element string is searched for using a distance table including the frequency of occurrence, with reference to FIG. 11. The basic flow of this retrieval process is similar to that of Examples 1 and 2.

Initially, distances between character elements (reference distances) tolerable in a search are determined depending on the reliability of character recognition. Thereafter, the frequency of occurrence of a character element corresponding to the reference distance is calculated based on a distance table. In this case, a relationship among a reliability of character recognition, a reference distance, and a frequency of occurrence are predetermined.

FIG. 11 shows an exemplary relationship among a reliability of character recognition, a reference distance, and a frequency of occurrence. It is assumed that a distance (reference distance) tolerable to a character element "人" (reliability 0.9) in document data is 10. The rate (the frequency of occurrence) that the character element "人" in the document data corresponds to the character element "人" as a search keyword is 0.9. Similarly, it is assumed that a distance (reference distance) tolerable to a character element "区" (reliability 0.4) in document data is 60. The rate (the frequency of occurrence) that the character element "区" in the document data corresponds to the character element "・口・" as a search keyword is 0.1. Similarly, character elements "構" and "成" have a frequency of occurrence of 0.9.

In this case, the average of the rates that each character element included in a character element string "人口構成" designated as a search keyword corresponds to character element in the document data is 0.7 (=(0.9+0.1+0.9+0.9)/4). The average rate of a match is set as a reference for retrieval to 0.5 or more in advance, for example. Therefore, the above-described misrecognized character element string "人区構成" can be retrieved with respect to the character element string "人口構成" as a search keyword.

Further, when a search result is displayed, the display can be modified depending on a matching rate. For example, a location in a document image corresponding to a search result in highlighted (emphasized by enhanced brightness or color, or by a flicker) depending on the level of the match rats. This facilitates a searcher to visually confirm the match rate.

Further, in the above-described example, the average of the match rates of character elements included in a search keyword is used as a reference for retrieval. Alternatively, the minimum match rate may be used as the reference. A case where character elements having high match rates (e.g., 0.8 or more) account for a certain proportion or more (e.g., half or more) of the entire character element string may be a reference. Further, when character elements having high match rates (e.g., 0.8 or more) account for a certain proportion or more (e.g. ⅔ or more) of the entire character element string, a reference may be modified to be a reduced criterion for the remaining character elements having low match rates so that the character elements can be easily detected.

Figure 12:
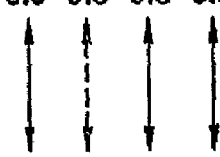
FIG. 12 is a diagram showing an exemplary relationship among the reliability of character recognition, a reference distance, and the frequency of occurrence.

For example, as shown in FIG. 12, it is assumed that document data including a character element string "人同構成" which has been incorrectly recognized for a character element string "人口構成" is searched for the character element string "人口構成" as a search keyword. In this case, a character element "同" which has been incorrectly recognized for a character element "・口・" has a reliability of character recognition of 0.3, a tolerable distance (reference distance) of 80, and a match rate of 0.0 with respect to a character element "口". In this situation, the character elements "同" and "・口・" do not match at all. However, the other character elements "人", "構", and "成" included in the search keyword have a high match rate (0.9). Therefore, for the character element "同", a tolerable distance (reference distance) is set to a value more than 80 (e.g., 120), so that a character element string matching the search keyword "人口構成" can be detected (when the distance table of FIG. 6 is used).

Figure 13:
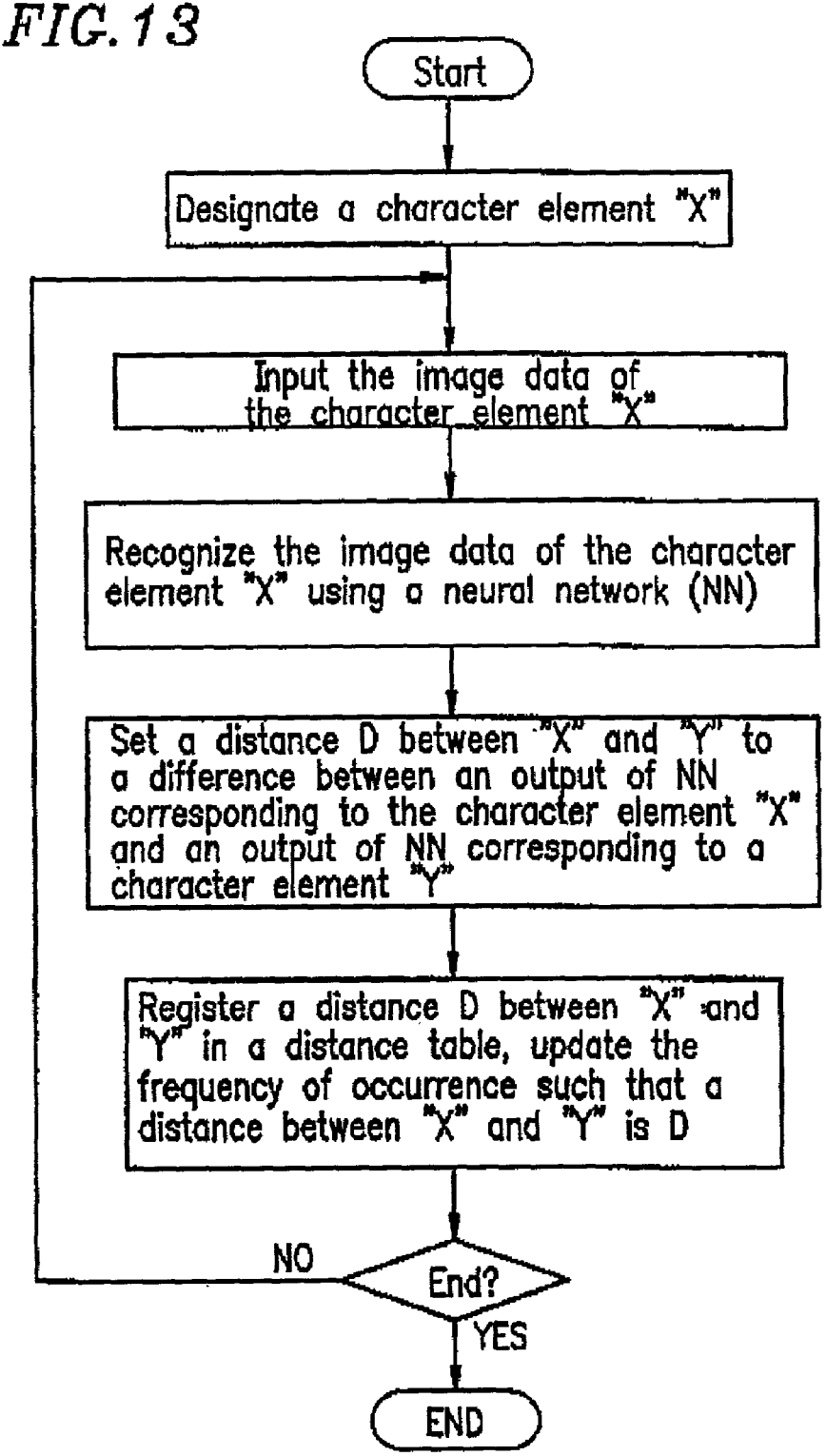
FIG. 13 is a diagram showing the steps of a process for producing a distance table having a frequency of occurrence.

FIG. 13 shows the steps of a process of producing a distance table including the frequency of occurrence. FIG. 13 also shows how to define a distance between a character element "X" and a character element "Y" and the frequency of occurrence of the distance. A similar process is applied to all combinations of character elements, so that distances and the frequencies of occurrence are defined for all combinations of character elements.

The process of FIG. 13 is repeated a sufficient number of times in terms of statistics so that the obtained frequency of occurrence of a distance D between the character element "X" and the character element "Y" can become a statistically probable value.

It should be noted that a distance table including the frequency of occurrence is produced using a neural network NN which has been caused to learn the character in advance. The neural network NN is not limited to a specific type.

Figure 14:
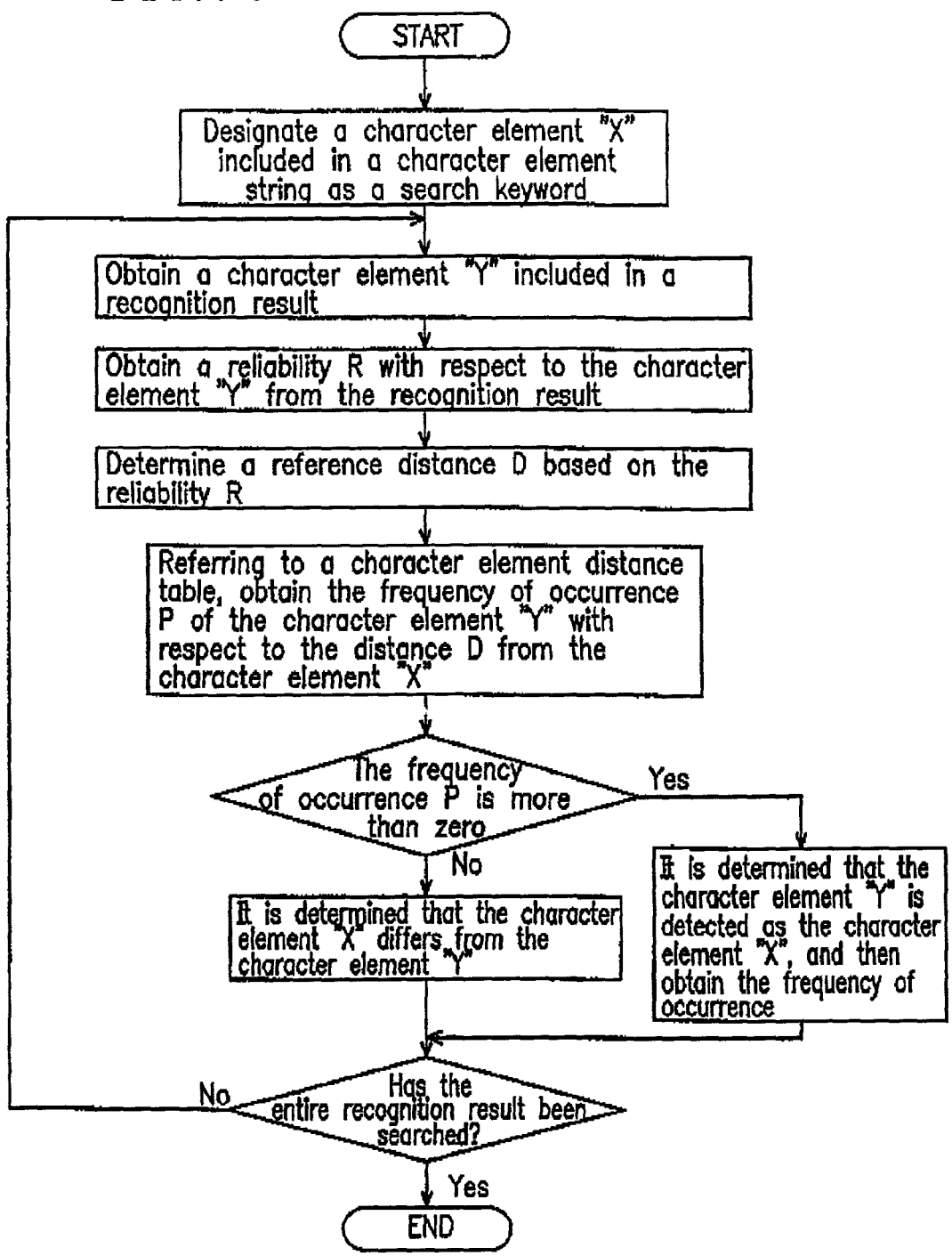
FIG. 14 is a flowchart showing the steps of a retrieval process of searching a recognition result for a character element string matching a search keyword using a distance table having a frequency of occurrence.

FIG. 14 shows the steps of a retrieval process of searching a recognition result for a character element string corresponding to a search keyword using a distance table including the frequency of occurrence. This retrieval process is executed by the CPU 110 in accordance with the document searching program.

By the retrieval process of FIG. 14, it is determined whether the recognition result includes a character element corresponding to a character element "X" included in a character element string as a search keyword. A similar process is repeated for all character elements in the character element string as a search keyword.

When all character elements in the character element string as a search keyword can be sequentially detected in the recognition result and all character elements have a probability of more than zero, a string of the frequencies of occurrence corresponding to the character element string as a search keyword is obtained. Based on the string of the frequencies of occurrence. It is determined whether the recognition result includes a character element string corresponding to the character element string as a search keyword. This determination may be performed based on the average or minimum of the string of the frequencies of occurrence.

In FIG. 14, a reliability R indicates a reliability of character recognition. The reliability R is predetermined for each character element included in the recognition result. A relationship between the reliability R and the reference distance D is also predetermined.

As described above, information on the frequency of occurrence of a character element is included in a distance table in addition to the distances between the character elements. Therefore, references or methods for searching can be switched depending on the frequency of occurrence even if distances are the same, thereby making it possible to achieve a higher precision search.

Example 4

In Example 4, a character element string designated as a search keyword is developed into a plurality of character element strings in advance using a character element distance table. A retrieval process is executed for each of the plurality of character element strings.

Hereinafter, description will be given of a retrieval process in which a character element string "日本" is designated as a search keyword, and the recognition result of FIG. 4 is searched for a character element string corresponding to the search keyword. This retrieval process is executed by the CPU 110 in accordance with the document searching program.

Initially, the character element string "・日本・" is divided into a character element "日" and a character element "本". A table indicating distances between character elements is referenced for each character element, and a character element having a distance from said character element less than a predetermined reference distance (e.g., 150) is combined with said character element (e.g., the character element "日" and a character element "目" are combined with the character element "日", and a character element "本", a character element "・大・", and a character element "大" are combined with the character element "・木・"). As a result, based on the character element string "・日本・" designated as a search keyword, new character element strings "日本", "目本", "日木", "目木", "日大", and "目大" are produced.

Thereafter, the recognition result (document data) of FIG. 4 is searched for each of the new character element strings. Therefore, the new character element string "日木" can be detected at a location of the original document where the character element string "・日本・" exists. As a result, a preferable search result can be obtained.

When no character element string is detected as a result of the search, the reference distance may be reset to a value (e.g., 200) which is more than the predetermined reference distance. Therefore, a greater number of character element strings are additionally produced and a similar retrieval process is executed. This makes it possible to detect recognition error which cannot be detected when a tolerable distance (reference distance) is 150, for example, in the distance table.

As described above, a character element string designated as a search keyword is replaced with a plurality of character element strings having potential recognition error using a character element distance table. Each of the plurality of character element strings is searched for. Therefore, similar to Example 1, a designated character element string can be retrieved from document data in which the designated character element string is incorrectly recognized as another character element string.

By using a distance table, the need of complicated distance calculation is removed and a high-speed search can be achieved.

Further, by using a distance table, the tolerance level to recognition error can be set to an appropriate value, so that an efficient search is made possible.

Example 5

In Example 5, using a character element distance table, one or more other character elements are added to each character element included in a recognition result (document data), and thereafter a search is performed.

Hereinafter, description will be given of a retrieval process in which a character element string "日本" is designated as a search keyword, and the recognition result of FIG. 4 is searched for a character element string corresponding to the search keyword. This retrieval process is executed by the CPU 110 in accordance with the document searching program.

Initially, a character element distance table is referenced, and a character element (e.g., for the character element "日", the character element "艮" and a character element "目", and for the character element "·木·", a character element "·木·" and a character element "大 ") having a distance from each character element included in a recognition result (document data) which is less than a reference distance (e.g. 150) is added to the recognition result as a candidate of the recognition result.

FIG. 15 shows an example in which candidates of the recognition result are additionally provided. In the example of FIG. 15, the character element "目" is additionally provided as a candidate of the recognition result with respect to the character element "日" of the recognition result. The character element "·木·" and the character element "大 " are additionally provided as candidates of the recognition result with respect to the character element "木".

Thereafter, the character element string "·日本·" designated as a search keyword is divided into the character element "日" and the character element "本". The recognition result is searched for the character element "日", so that the character element "日" is retrieved from the recognition result (document data). Thereafter, it is determined whether or not the character element "·木·" is included in the character elements ("·木·", "本", and "大 ") located next to the detected character element "日 ". Since the character element "·木·" is included in character elements ("·木·", "本", and "大 "), it is determined that the character element string "·日本·" is retrieved from the recognition result.

Even when a character element string designated as a search keyword includes three or more character elements, the character element string can be retrieved from a recognition result in a similar manner. Specifically, when all of the character elements included in the character element string designated as a search keyword are detected in sequence in the recognition result, it may be determined that the character element is detected in the recognition result.

As described above, one or more character elements are additionally provided with respect to each character element included in a recognition result (document data) using a table indicating distances between character elements. Therefore, similar to Example 1, even when a designated character element string is replaced with another character element string due to recognition error, a character element string corresponding to a designated character element string can be retrieved from document data.

Further, for each character element included in a recognition result (document data), one or more character elements are additionally provided in advance, thereby making it possible to omit the stop of referencing a distance table upon search.

It should be noted that the example in which a distance table is used in a search as described in Examples 1 through 3, and the example in which a character element designated as a search keyword is developed into a plurality of character element strings using a distance table as described in Example 4 can be used along with Example 5.

Example 6

Figures 16, 17:
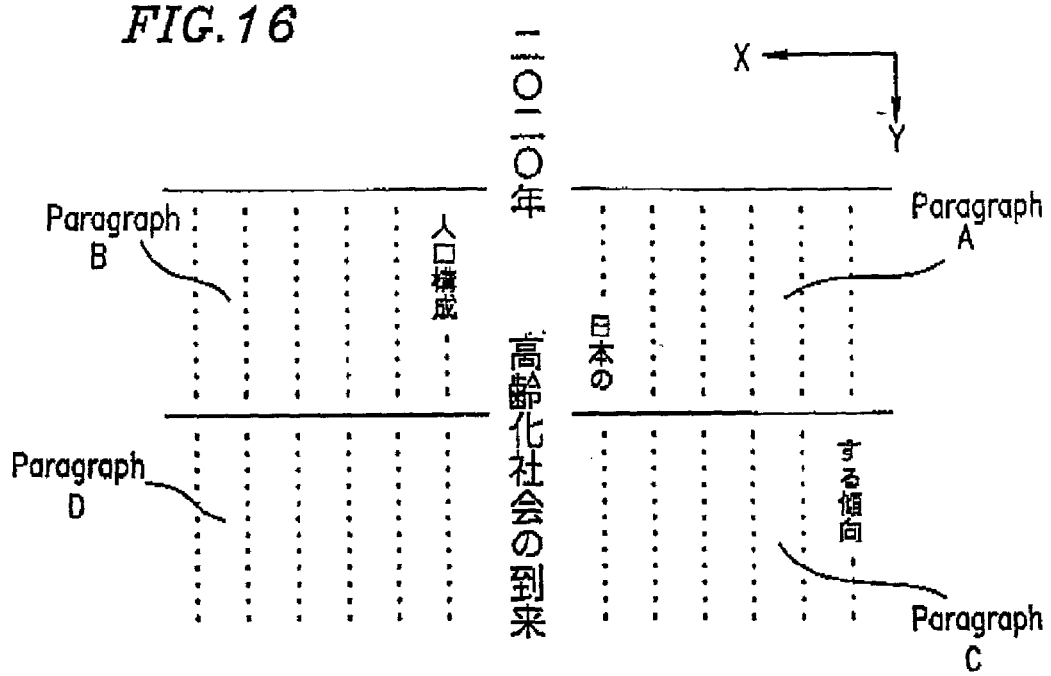
FIG. 16 is a diagram showing an exemplary original document including paragraphs A through D.
FIG. 17 shows an exemplary table indicating a result of recognizing the order of the paragraphs.

FIG. 16 shows an exemplary original document including paragraphs A through D. In the example of FIG. 16, it is assumed that the proper order of the paragraphs is paragraph A, paragraph B, paragraph C, and paragraph D. Specifically, it is assumed that the last sentence of paragraph A is followed by the leading sentence of paragraph B, the last sentence of paragraph B is followed by the leading sentence of paragraph C, and the last sentence of paragraph C is followed by the leading sentence of paragraph D.

When the original document of FIG. 16 is subjected to character recognition to obtain document data (recognition result), the order of the paragraphs in the original document is not necessarily recognized properly. The layout pattern of paragraphs varies among documents, and therefore it is extremely difficult to automatically recognize the order of the paragraphs. Therefore, the order of the paragraphs may be incorrectly recognized.

Example 6 provides a retrieval method capable of retrieving a character element string from a recognition result even when the order of the paragraphs is incorrectly recognized.

FIG. 17 shows an exemplary table indicating a result of recognizing the order of paragraphs. Such a table is produced by the CPU 110 executing the document registering program, and is then stored in the memory 140.

The recognized paragraphs are identified by respective specific paragraph labels (A, B, C, and D in FIG. 17).

The table of FIG. 17 shows, for each paragraph, the paragraph label(s) of paragraph(s) having the possibility of being concatenated with the subject paragraph and a recognition result thereof. For example, the first row of the table of FIG. 17 indicates that a paragraph having the being concatenated with paragraph A is either paragraph B or paragraph C and that the last phrase of paragraph A is "日本の".

A paragraph having the possibility of being concatenated with a specific paragraph is determined by referencing a positional relationship between each paragraph in character recognition of the image data of an original document. For example, when original data is in the form of vertical writing, a paragraph having the possibility of being concatenated with a certain paragraph X is determined to be either a paragraph located below paragraph X (e.g., paragraph Y) or a paragraph located to the left of paragraph X (e.g., paragraph Z). In this case, paragraphs Y and Z are registered in the above-described table as a paragraph having the possibility of being concatenated with paragraph X.

Alternatively, a paragraph having the leading sentence which can be grammatically concatenated with the last sentence of paragraph X may be determined as a paragraph having the possibility of being concatenated with paragraph X.

Alternatively, when the paragraphs of an original document are laid out under a specific rule, a paragraph having the possibility of being concatenated with paragraph X may be determined based on such a specific rule.

Hereinafter, description will be given of a retrieval process of searching the recognition result for a character element string "日本の人口" using the table of FIG. 17. The retrieval process is executed by the CPU 110 in accordance with the document searching program.

Similar to Example 1 through Example 5, each paragraph is searched for character elements "日", "本 ", "の", "人", and "·口·" included in the character element string "日本の人口" in sequence.

In the example of FIG. 17, the character elements "日", "本", and "の" are sequentially detected at the end of paragraph A. Thereafter, the character element "人" is searched for. In this case, a paragraph having the possibility of being concatenated with paragraph A is paragraph B or paragraph C. Therefore, whether the character element "人" exists at the leading positions of paragraph B and paragraph C is determined. In the example of FIG. 17, the character element "人" is detected at the leading position of paragraph B. Whether the character element "・口・" exists at a location next to the character element "人" is determined. As a result, eventually, all of the character elements included in the character element string "日本の人口" are retrieved.

Figure 18:
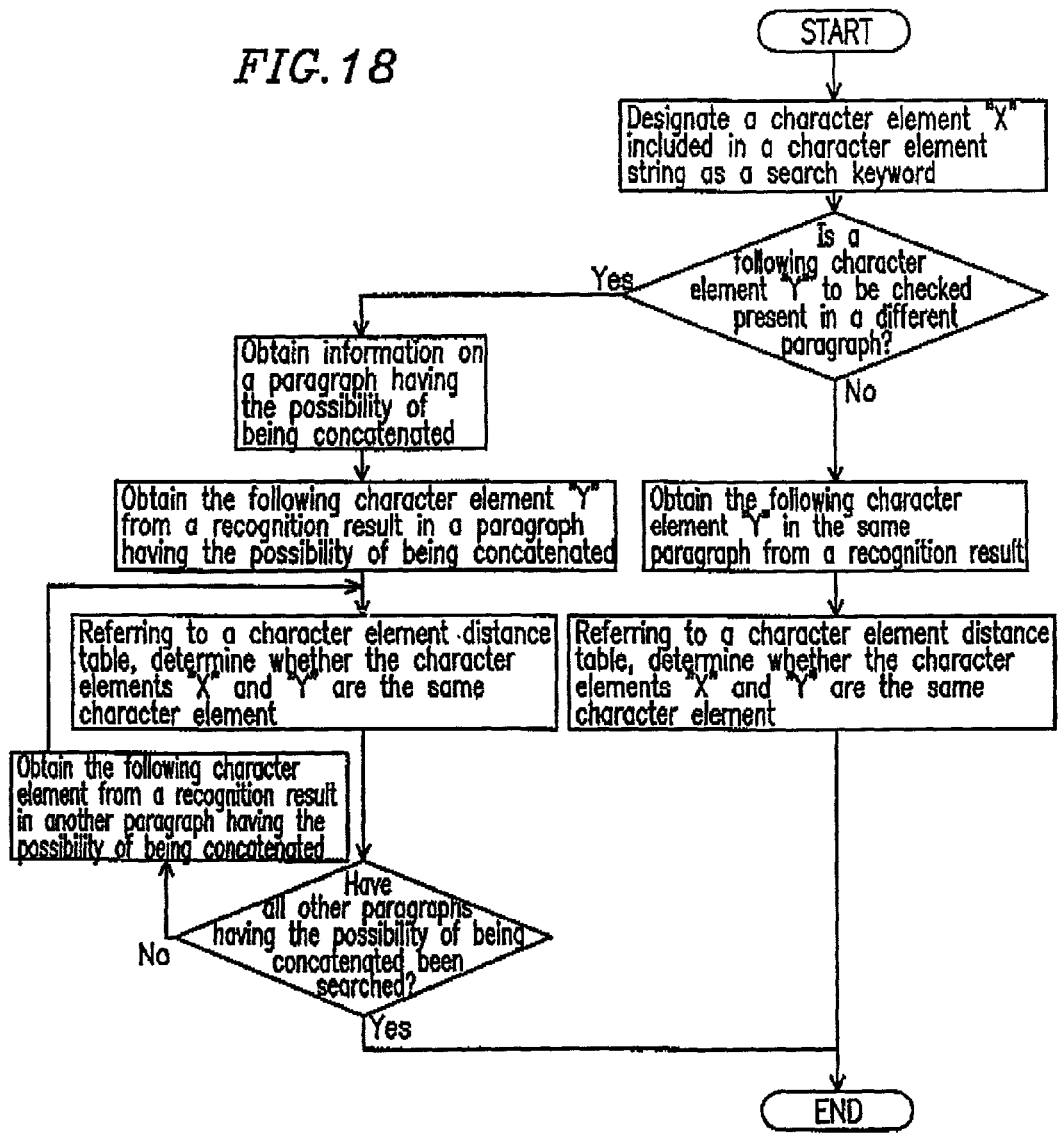
FIG. 18 is a flowchart showing the steps of a retrieval process of searching a recognition result for a character element string designated as a search keyword by taking into account a concatenation relationship between paragraphs.
Figures 24, 25:
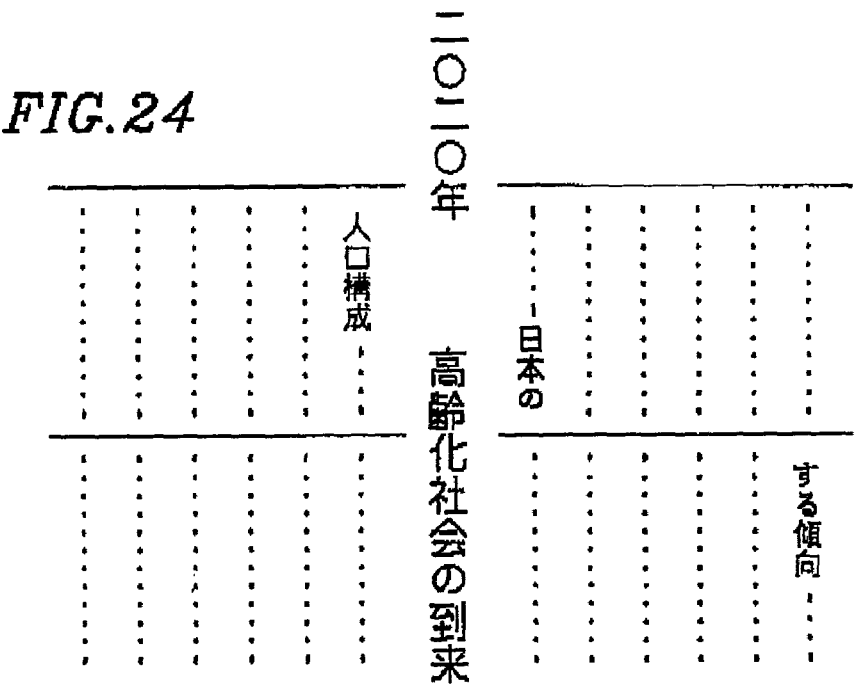
FIG. 24 is a diagram showing an exemplary original document having a layout.
FIG. 25 is a diagram showing an original document and a recognition result obtained by subjecting the original document to character recognition.
Figure 28:
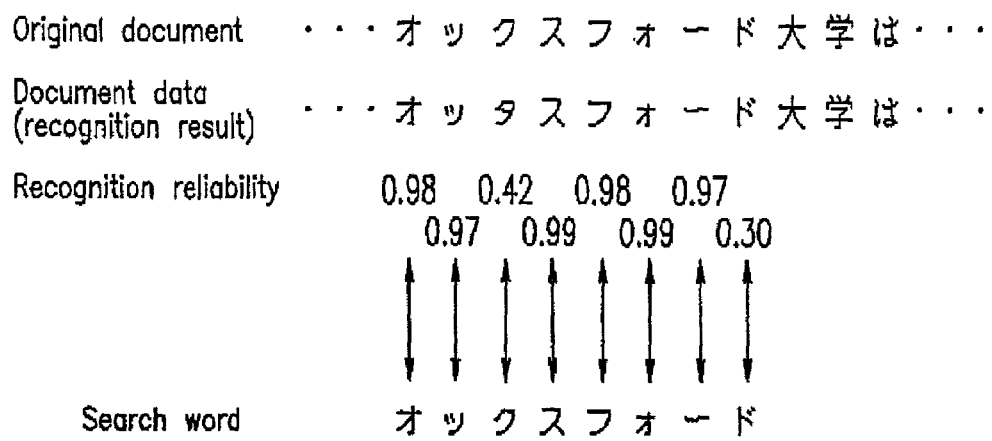
FIG. 28 is a diagram used for explaining a retrieval process for searching a recognition result for a search word.

FIG. 18 shows the steps of a retrieval process of searching a recognition result for a character element string designated as a search keyword using the table of FIG. 17 and a character element distance table (e.g., that of FIG. 2) while taking into account a concatenation relationship between paragraphs. This searching process is executed by the CPU 110 in accordance with the document searching program.

By the retrieval process of FIG. 18, whether a character element correcting to a character element "X" included in a character element string as a search keyword is included in a recognition result is determined. A similar retrieval process is repeated for all character elements included in the character element string as a search keyword.

It is assumed that the character element "X" does not match any of character elements at the end portion of paragraph A. In this case, it is determined whether the character element "X" matches the leading character element "Y" of one of paragraphs B and C having the possibility of being concatenated with paragraph A. That a paragraph having the possibility of being concatenated with paragraph A is paragraph B or paragraph C is previously defined in FIG. 17.

Whether the character element "X" matches the character element "Y" in determined using the character element distance table. This determination is as described in Examples 1 through 5.

As described above, a plurality of paragraphs having the possibility of being concatenated with a specific paragraph are defined in advance. Therefore, even when the concatenation relationship between paragraphs is incorrectly recognized in character recognition, a character element string extending over a plurality of paragraphs can be appropriately detected.

Besides from the concatenation between paragraphs, a concatenation between lines in a paragraph may be ambiguous (e.g., a figure, a table, a caption, or the like exists between lines). In this case, each line is similarly given a different number, and for a specific line, a plurality of lines having the possibility of being concatenated with the specific line are defined in advance. Therefore, it is possible to appropriately detect a character element string extending over a plurality of lines.

Further, a concatenation between character elements may be ambiguous (e.g., a figure, a table, or the like is inserted between character elements, or a character element string is decoratively arranged, e.g., a character element string is in the form of a curve). In this case, each line (character element) is similarly given a different number, a plurality of lines (character elements) having the possibility of being concatenated with a specific line (character element) are defined in advance. Therefore, a character element string extending over a plurality of lines (character elements) can be appropriately detected.

As described above, for a specific character element of a plurality of character elements included in a recognition result, a plurality of character elements having the possibility of being concatenated with the specific character element are defined in advance. In a retrieval process, the specific character element is concatenated with one of the plurality of character elements having the possibility of being concatenated with the specific character element. Whether the resultant character element string matches at least a portion of a character element string as a search keyword is determined. Therefore, even when a concatenation relationship between character elements is incorrectly recognized in character recognition, a character element string extending over a plurality of character elements can be appropriately detected.

The specific character element may be located at the end of a row or column while each of a plurality of character elements having the possibility of being concatenated with the specific character element may be located at the head of a row or column.

Further, the specific character element and one of a plurality of character elements having the possibility of being concatenated with the specific character element may be located on the name row or column. The specific character element and another one of the plurality of character elements may be located on different columns or rows and the same column or row.

It should be noted that in the above examples, a plurality of paragraphs (lines or character elements) having the possibility of being concatenated with a specific paragraph (line or character element) are defined in advance. Alternatively, a plurality of paragraphs (lines or character elements) having the possibility of preceding a specific paragraph (line or character element) may be defined in advance. In this case, the same effects as described above can be obtained.

A paragraph label (line or character element) having the possibility of being concatenated with a specific paragraph (line or character element) may be represented by the absolute value of the paragraph label (line or character element), as described above or alternatively the relative value of the paragraph label (line or character element). For example, paragraph B and paragraph C having the possibility of being concatenated with paragraph A may be represented by paragraph+1 and paragraph+2, respectively.

Example 7

FIG. 19 shows an exemplary table indicating a recognition result of a concatenation relationship between paragraphs. Such a table is produced by the CPU 110 executing the document registering program, and then stored in the memory 140.

The table of FIG. 19 indicates, for each paragraph, a recognition result and the location of the paragraph. The location of a paragraph is, for example, represented by an X-Y coordinate system where the upper right corner of an original document is an original point. The X and Y axes are oriented as shown in FIG. 16, for example. For example, the first line in the table of FIG. 19 indicates that the end of paragraph A is "日本の" and the location of paragraph A is a coordinate point (X, Y)=(10, 100).

A retrieval process is substantially similar to that of Example 6. When the character elements "日", "本", and "の" are sequentially detected and thereafter the character element "人" is searched for, a paragraph having the possibility of being concatenated with paragraph A is determined based on the location of paragraph A stored in the table of FIG. 19. In this case, the coordinate point of paragraph A is (X, Y)=(10, 100). As paragraphs having the possibility of being concatenated with paragraph A, paragraph C [(X, Y)=(10, 200)] having a next largest Y coordinate to paragraph A and paragraph B [(X, Y)=(100, 100)] having a next largest X coordinate to paragraph A are determined.

In this case, since the character element "人" is detected at the leading position of paragraph B, whether the character element "口" exists next to the character element "人" is determined. As a result, eventually, all of the character elements included in the character element string "日本の人口" are detected.

It should be noted that when original data is in the form of vertical writing, a paragraph having the possibility of being concatenated with a certain paragraph X may be determined to be either a paragraph located below paragraph X (e.g., paragraph Y) or a paragraph located to the left of paragraph X (e.g., paragraph Z).

Alternatively, when the paragraphs of an original document are laid out under a specific rule, a paragraph having the possibility of being concatenated with paragraph X may be determined based on such a specific rule.

It should be noted that the original point of the X-Y coordinate system and the directions of the X coordinate axis and the Y coordinate axis are freely selected. Further, the order of values which are assigned to respective paragraphs or figures may be used as a unit of a coordinate value.

As described above, for each paragraph, information indicating the location of the paragraph is held. Therefore, even when the concatenation relationship between paragraphs is incorrectly recognized in character recognition, a character element string extending over a plurality of paragraphs can be appropriately detected.

Further, by holding information indicating the coordinates of paragraphs, a method for determining a paragraph having the possibility of being concatenated with the specific data can be changed without a change in the document data. The coordinates indicating the locations of the paragraphs can be used to reproduce the layout of a document.

It should be noted that in the above-described example, the coordinate indicating the location of each paragraph is held. Alternatively, each line or each character element may be given a different number and a coordinate indicating the location of each line or each character element may be held. In this case, therefore, a character element string extending over a plurality of lines or a plurality of character elements can be searched for.

Example 8

Similar to Example 6, description will be given of a retrieval process in which document data (recognition result) obtained by subjecting the original document shown in FIG. 16 to character recognition is searched for the character element string "日本の人口".

In this case, as shown in FIG. 20, the recognition result is held in the form of a specific paragraph concatenated with one of a plurality of paragraphs having the possibility of being concatenated with the specific paragraph. Such a recognition result is stored in the memory 140, for example.

In the example of FIG. 20, two recognition results (character recognition result 1 and character recognition result 2) are held. The character recognition result 1 is obtained by concatenating paragraph A with paragraph C having the possibility of being concatenated with paragraph A. The character recognition result 2 is obtained by concatenating paragraph A with paragraph B having the possibility of being concatenated with paragraph A.

When the recognition results of FIG. 20 are searched for the character element string "日本の人口", both the character recognition result 1 and the character recognition result 2 are searched for the character element string "日本の人口". As a result, the character element string "日本の人口" can be retrieved from the character recognition result 2.

It should be noted that when as shown in FIG. 20 a recognition result is held while assuming a plurality of concatenation relationships between paragraphs, an upper limit may be placed on the number of character elements included in a character element string designated as a search keyword (e.g., ten character elements). Only nine character elements from the leading positions of paragraphs B and C having the possibility of being concatenated with paragraph A are concatenated with paragraph A and the resultant paragraph A is held. In this case, a character element string of ten or less character elements extending over paragraph A and paragraph B or C can be searched for.

As described above, by taking into account a plurality of paragraphs having the possibility of being concatenated with a specific paragraph, a plurality of recognition results are held in advance. Therefore, even when the concatenation relationship between paragraphs is incorrectly recognized in character recognition, a character element string extending over a plurality of paragraphs can be appropriately detected. Further, by holding a plurality of recognition results in advance, the steps of a retrieval process are simplified, thereby making it possible to use a conventional retrieval process.

Example 9

Description will be given of a retrieval process of searching document data (recognition result), which has been obtained by subjecting an original document having a layout as shown in FIG. 21, for a character element string "神戸".

In the example of FIG. 21, the sentences in the original document are in the form of horizontal writing. In this case, a distance between character elements is small in a vertical direction. Therefore, a concatenation relationship between character elements is likely to be incorrectly recognized in character recognition.

In Example 9, a retrieval method in which a character element string can be appropriately retrieved from a recognition result even when a concatenation relationship between character elements is incorrectly recognized in character recognition is provided.

FIG. 22A shows a table indicating a recognition result of character recognition under an assumption that an original document is in the form of vertical writing. The recognition result of FIG. 22A is a result of recognizing the original document of FIG. 21 on a column-by-column basis.

FIG. 22B shows a table indicating a recognition result of character recognition under an assumption that an original document is in the form of horizontal writing. The recognition result of FIG. 22B is a result of recognizing the original document of FIG. 21 on a row-by-row basis.

The above-described tables are produced by the CPU 110 executing the document registering program, and then stored in the memory 140.

When the character element string "神戸" is designated as a search keyword, the recognition result of FIG. 22A is searched for the character element string "神戸", while at the same time the recognition result of FIG. 22B is searched for the character element string "神戸". As a result, the character element string "神戸" is retrieved from the recognition result corresponding to line number 3 of the table of FIG. 22B. Therefore, it is found that the original document of FIG. 21 includes the character string "神戸".

As described above, recognition results corresponding to a plurality of layouts are held. Therefore, even when it is difficult to recognize the proper layout of a document, a character element string can be retrieved from a recognition result of such a document. Further, by holding recognition results corresponding to a plurality of layouts, it is possible to use a conventional retrieval process.

It should be noted that in the above-described example, two layouts i.e., vertical writing and horizontal writing, are assumed. The present invention is not limited to these layouts. For example, a layout may be obliquely oriented. Such a layout can be processed in a manner similar to that for vertical and horizontal writing layouts.

Example 10

Example 10 provides a retrieval method in which a designated character element string can be properly retrieved from a recognition result even when the layout of an original document is incorrectly recognized.

Description will be given of a retrieval process of searching document data (recognition result), which has been obtained by subjecting an original document having a layout as shown in FIG. 21, for the character element string "神戸".

It is now assumed that the layout of the original document is incorrectly recognized, so that the table of FIG. 22A is held. Different from Example 9, the table of FIG. 22B is not held.

Initially, the character element string "神戸" is divided into a character element "神" and a character element "戸". Each character element is searched for using the table of FIG. 22A. As a result, the character element "神" is retrieved from the third character of the recognition result corresponding to line number 5 of the table of FIG. 22A. The character element "戸" is retrieved from the third character of the recognition result corresponding to line number 4 of the table of FIG. 22B.

When all of the character elements included in the character element string "神戸" are detected in the recognition result, whether the character element string "神戸" is detected is determined based on a positional relationship between each character elements. In this case, the character element "神" and the character element "戸" are detected at the same character ordinal position in the adjacent rows. Therefore, it is determined that the character element string "神戸" is detected.

It should be noted that whether a character element string is detected is determined using a reference different from the above-described reference. Specifically, when a positional relationship between each detected character element is different from the above-described relationship, it is determined that the character element string is detected. For example, when coordinates indicating the positions of character elements are known, it may be determined that the character element string is detected if a distance between each character element is less than or equal to a predetermined distance and the character elements are arranged linearly.

Further, another set of steps of a retrieval process may be used. For example, all of the character elements may not be searched for as described above. Only when the character element "神" is detected, lines adjacent to the line in which the character element "神" has been detected may be searched for the character element "戸". Therefore, an unnecessary portion of the retrieval process can be obviated, thereby making it possible to perform the retrieval process efficiently.

As described above, each character element included in a character element string designated as a search keyword is detected in a recognition result, and whether the character element string is detected is determined based on a positional relationship between each character element. Therefore, even when the layout of an original document is incorrectly recognized, a designated character element string can be appropriately detected.

Example 11

In Example 11, a character element string designated as a search keyword is divided into two or more character element strings, and based on a positional relationship between paragraphs in which the divided character elements are detected, whether the search keyword is detected is determined.

Hereinafter, a description will be given of a retrieval process in which document data (recognition result) obtained by subjecting the original document shown of FIG. 16 to character recognition is searched for the character element string "日本の人口".

Similar to Example 7, a table (FIG. 19) indicating a recognition result of a concatenation relationship between paragraphs is provided in advance.

The table of FIG. 19 indicates, for each paragraph, a recognition result and the location of the paragraph. The location of a paragraph is, for example, represented by an X-Y coordinate system where the upper right corner of an original document is an original point. The X and Y axes are oriented as shown in FIG. 16, for example.

Initially, the character element string "日本の人口・" designated as a search keyword is divided into two character element strings. For example, the character element string "日本の人口" is divided into a character element string "・日本・" and a character element string "・の人口・.".

Thereafter, each paragraph is searched for the two divided character element strings. The search is repeated for all division patterns of the character element string "日本の人口". For example, in FIG. 16, when the character element string "日本の人口" is divided into a character element string "日本の" and a character element string "・人口・.", the character element string "日本の" is detected at the end of paragraph A and the character element string "人口" at the head of paragraph B. When all of the divided character element strings are detected, whether the character element string "日本の人口" is detected is determined based on a positional relationship between the detected paragraphs.

For example, when the paragraphs in which the two character element strings are detected are adjacent to each other or close to each other, it is determined that the character element string designated as a search keyword is detected. In the example of FIG. 16, the coordinates (X, Y)=(10, 100) of paragraph A at which the character element string "日本の" is detected and the coordinates (X, Y)=(100, 100) of paragraph B at which the character element string "人口" is detected have the same Y coordinate and are adjacent to each other. Therefore, it is determined that the character element string "日本の人口" is detected in the recognition result.

Further, when a character element string is divided into a plurality of character element strings and paragraphs are searched for the plurality of character element strings as described above, it is preferable that only the end and head of each paragraph are searched, thereby making it possible to improve the efficiency of a retrieval process.

It should be noted that in the above-described example, a character element string designated as a search keyword is divided into two character element strings. A character element string designated as a search keyword is divided into three or more character element strings. In this case, a similar retrieval process can be performed.

In the above-described example, a character element string extending over a plurality of paragraphs is searched for. Similarly, a character element string extending over a plurality of lines can be searched for. In this case, a character element string designated as a search keyword is divided into a plurality of character element strings, and each line is searched for the divided character element strings. When all of the divided character element strings are detected at adjacent locations, it may be determined that the search keyword is detected.

As described above, in Examples 6 through 11, even when paragraphs or lines are incorrectly (or irregularly) concatenated with each other, a character element string extending over a plurality of paragraphs can be properly detected.

Further, when there is character recognition error or when paragraphs or lines are incorrectly or irregularly concatenated with each other or when vertical or horizontal writing is incorrectly recognized or irregularly used, a designated character element string can be searched for.

It should be noted that each of Examples 1 through 11 can be solely performed or a combination of at least two of Examples 1 through 11 can be performed.

The retrieval processes of the present invention can be typically performed by software on a computer. Alternatively, the retrieval processes of the present invention may be performed by hardware or a combination of software and hardware.

A program (document searching program) representing a part or an entirety of the retrieval process of the present invention is, for example, stored in the memory 170. Alternatively, the document searching program may be recorded in any type of recording medium, such as, a floppy disk, a CD-ROM, and a DVD-ROM. The document searching program recorded in such a recording medium is loaded via a disk drive (not shown) to a memory. Alternatively, the document searching program (or a part thereof) may be downloaded via a communication network or broadcasting to a memory in a computer. The computer serves as a retrieval device when a CPU incorporated into a computer executes the document searching program.

Example 12

In Example 12, based on the number of character elements included in a character element string designated as a search keyword and the number of character elements matching a recognition result out of the character elements included in the character element string designated as a search keyword, a probability (evaluated value) that a search result matches the search keyword is obtained. The correctness of the search result is determined based on the probability (evaluated value).

In the description below, a "character element" is simply referred to as a "character".

Generally, words in various languages have redundancy. Even if several characters in a word are not known, the word can often be identified. Such a tendency is more significant as the number of characters included in a word is increased. In this example, it is shown that by use of the tendency of words, a word can be retrieved from a character string including an error.

Hereinafter, referring to FIG. 26, description will be given of a retrieval process in which a recognition result " . . . オッタスフォード大学は . . . " obtained by subjecting an original document " . . . オックスフォード大学は . . . " to character recognition is searched for a search word "オックスフォード". In this case, the recognition result is stored as document data in the memory 140. The memory 140 may be any type of storage medium.

It should be noted that each character in the recognition result is given a reliability indicating the probability of the recognition result (a probability of a correct result). A probability table is prepared in advance before executing search.

FIG. 27 shows an exemplary probability table. The probability table is used to obtain a probability Pa(n, k) with respect to parameters n and k where n indicates the number of characters included in a search word and k indicates the number of characters matching a corresponding character in searched document data out of the n words. The probability Pa(n, k) indicates a probability that a search result matches the search word.

The probability table of FIG. 27 may be calculated using a large number of texts having no error and a word dictionary. In a calculation method, the number of characters matching the characters in a word are examined for all sets of n consecutive characters in text data. All sets of n consecutive characters are categorized and counted by the number of matched characters to obtain the cumulative total Nk (i=1, . . . , n). With the cumulative total Nk, a probability that a set of n consecutive characters having k matched characters out of the n characters is identified as a search word can be calculated to be Pa(n, k) (=Nn/Nk).

The probability Pa(n, k) varies depending on different word notation or the positions of k matched characters, even if the number of characters n is the same. In this example, the probability Pa(n, k) is independent of different word notation or the positions of k matched characters. In other words, the probability Pa(n, k) is calculated by accumulating all words having the same number of characters n and having k matched characters and using the sum (or average) of cumulative totals.

It should be noted that the probability Pa(n, k) may be calculated for each word notation, each positional pattern of matched characters, or each character type of words (a Japanese Kanji character, a Japanese Hiragana character, a Japanese Katakana character, the English alphabet, etc.).

It should be noted that when a word has a large number of characters, if the number of matched characters k is equal to a certain value, the probability may be represented only by the number of matched characters k without depending on the number of characters n (Pa(n, k) is substantially constant even if n varies). In this case, a probability Pa(k) depending only on the number of matched characters k may be used instead of the probability Pa(n, k).

In the example shown in FIG. 26, document data to be searched matches the search word "オックスフォード" with respect to all characters except for a misrecognized "タ" (reliability 0.42).

The correctness Pw of the checked portion (search result) is represented by $$Pw = Pa(n,k) \cdot Pb(k) \quad \text{(formula 1)}$$

where Pa(n, k) is a probability that the search result is identified as a search keyword when the search result matches the search keyword in k characters of n characters. In this case, out of n=8 characters of the word "オックスフォード", the search result matches the search keyword in k=7 characters. Therefore, according to FIG. 27, Pa(8, 7)=0.9.

Pb(k) indicates A probability that the k characters all are characters to be searched for. A reliability given to each character is a probability. Therefore, Pb(k) may be a product of the reliabilities of characters matching a recognition result. In FIG. 26, Pb(7)=0.98×0.97×0.99×0.98×0.99×0.97×0.96=0.85.

Therefore, the value indicating the correctness of the checked portion (search result) is Pw=Pa(8, 7)×Pb(7)=0.9×0.85=0.765. The value of Pw is more than a predetermined threshold (in this example, 0.6). Therefore, the correctness of this checked portion (search result) is acknowledged.

It should be noted that in the case of a word having a large number of characters, the product of reliabilities Pb(k) tends to be small. Therefore, Pb(k) may be normalized in a certain method. When the reliability of each character is not a probability, the reliability may be converted to a probability or the simple average of the reliabilities may be used instead of Pb(k).

Referring to FIG. 26, when there are some character(s) having a small reliability in the seven correct characters, if such character(s) having a small reliability are not counted, the resultant Pw becomes large. Therefore, the number of correct characters k may be selected in a manner to cause Pw to be larger. (If seven characters are correct, Pw=Pa(8, 7)×Pb(7)=0.90×(0.98×0.97×0.99×0.98×0.99×0.97×0.30) =0.239. In contrast, if the eighth correct character is not included and six characters are assumed to be correct, Pw=Pa(8, 6)×Pb(6)=0.85×(0.98×0.97×0.99×0.98×0.99×0.97)=0.752. The latter is adopted as Pw.)

It should be noted that in the case of a database where a reliability is not given to each character, Pa(n, k) where n is the length of a search word and k is the number of k matched characters may be used as a value indicating the correctness of a matching portion.

It should be noted that although a non-matched character is not used as information in this case, if the non-matched character has a high reliability, it is considered that the character is highly likely to be correct (i.e., there is a word having only a single different character, and the correctness is low for a search result). A penalty may be introduced using a reliability of a non-matched character (when the reliability of the non-matched character is higher than a predetermined threshold or when the number of such characters is more than a predetermined value, even if Pw indicating the correctness of a checked portion is more than a threshold, the checked portion is not adopted).

As described above, even if a search word does not match a word in a text document with respect to all characters, the text document having recognition errors can be searched using the redundancy of a word. The problem of determining the number of non-matched characters can be solved by numerically representing the correctness of a search portion by above formula (1) using the probability table of FIG. 27 produced based on a database of a large amount of actual data text.

Example 13

In Example 13, a retrieval process is executed using the character element distance table described in Example 3 as well as the probability table described in Example 12.

In the description below, a "character element" is simply referred to as a "character".

Figure 29:
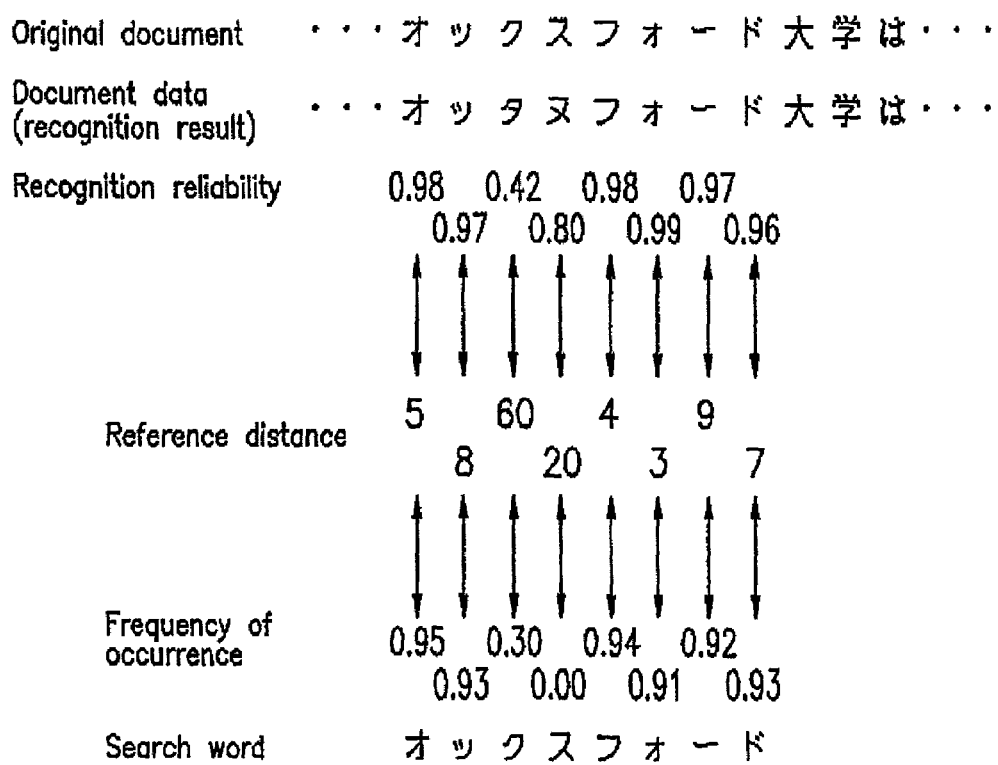
FIG. 29 is a diagram used for explaining a retrieval process for searching a recognition result for a search word.

Hereinafter, referring to FIG. 29, a description will be given of a retrieval process in which a recognition result "...オックスフォード大学は..." obtained by subjecting an original document "...オックスフォード大学は..." to character recognition is searched for a search word "・オックスフォード". In this case, the recognition result is stored as document data in the memory 140. The memory 140 may be any type of storage medium.

Each character in the recognition result is given a reliability indicating the probability of the recognition result (a probability of a correct result). Similar to Example 12, the probability table of FIG. 27 is calculated prior to the search.

In the search, similar to Example 1, a reference distance to be compared with distances between character elements is determined based on the reliability of each character. Similar to Example 1, the frequency of occurrence (probability) of a character element is determined based on the reference distance.

Pw Indicating the correctness of a checked portion (search result) is represented by $$Pw = Pa(n, k) \quad \text{(formula 2)},$$

where Pa(n, k) is defined in the probability table of FIG. 27.

The number of characters of the recognition result itself matching the characters of a search word is six (i.e., first, second, fifth, sixth, seventh, and eighth characters). By referencing the character element distance table, the third character matches that of the search word. Eventually, the recognition result matches the search word with respect to seven characters (a character "タ" of the recognition result having a reliability of 0.42 has a probability of 0.3 (>0) of being "ダ"). Therefore, Pw=Pa(8, 7)=0.9. If it is now assumed that a predetermined threshold is 0.80, the value of Pw is more than the threshold. Therefore, the correctness of the search result may be acknowledged.

However, "search noise" that a character string other than a search character string is searched for may be desirably reduced as much as possible. In this case, in order to make a more detailed determination of the correctness, the reference value of distance (reference distance) is increased for the non-matching fourth character "ス" (i.e., a reliability of recognition is reset to a smaller value and the reference value of distance (reference distance) is obtained). Therefore, recognition error which cannot be detected due to the zero frequency of occurrence when the reference value of distance (reference distance) is 20 can be detected.

When a non-matched character is handled as a wildcard which indicates any potential character, a word which accidentally has a single different character is highly likely to be retrieved. However, if the reference value of distance (reference distance) is reset to a slightly larger value, it is possible to search only for a similar character in the character element distance table which tends to be incorrectly recognized under an assumption of recognition error. As a result, search noise can be reduced.

Further, if a reliability of recognition is high due to recognition error, the frequency of occurrence is zero (the reference value of distance (reference distance) is a slightly too small due to a high reliability. However, if the reference value of distance (reference distance) is slightly larger, the frequency of occurrence is greater than zero). Such a situation can be avoided when the reference value of distance (reference distance) is reset so as to be a larger value.

It should be noted that the range of an increase in the reference value of distance (reference distance), i.e., the range of a decrease in a reliability of recognition, may be controlled depending on the value of Pw indicating the correctness of a search result. Further, the number of characters whose reference value of distance is increased (a reliability of recognition is decreased) may be controlled.

It should be noted that whether the reference value of distance (reference distance) is increased or a wildcard is used may be controlled depending on the value of Pw indicating the correctness of a search result.

Figure 30:
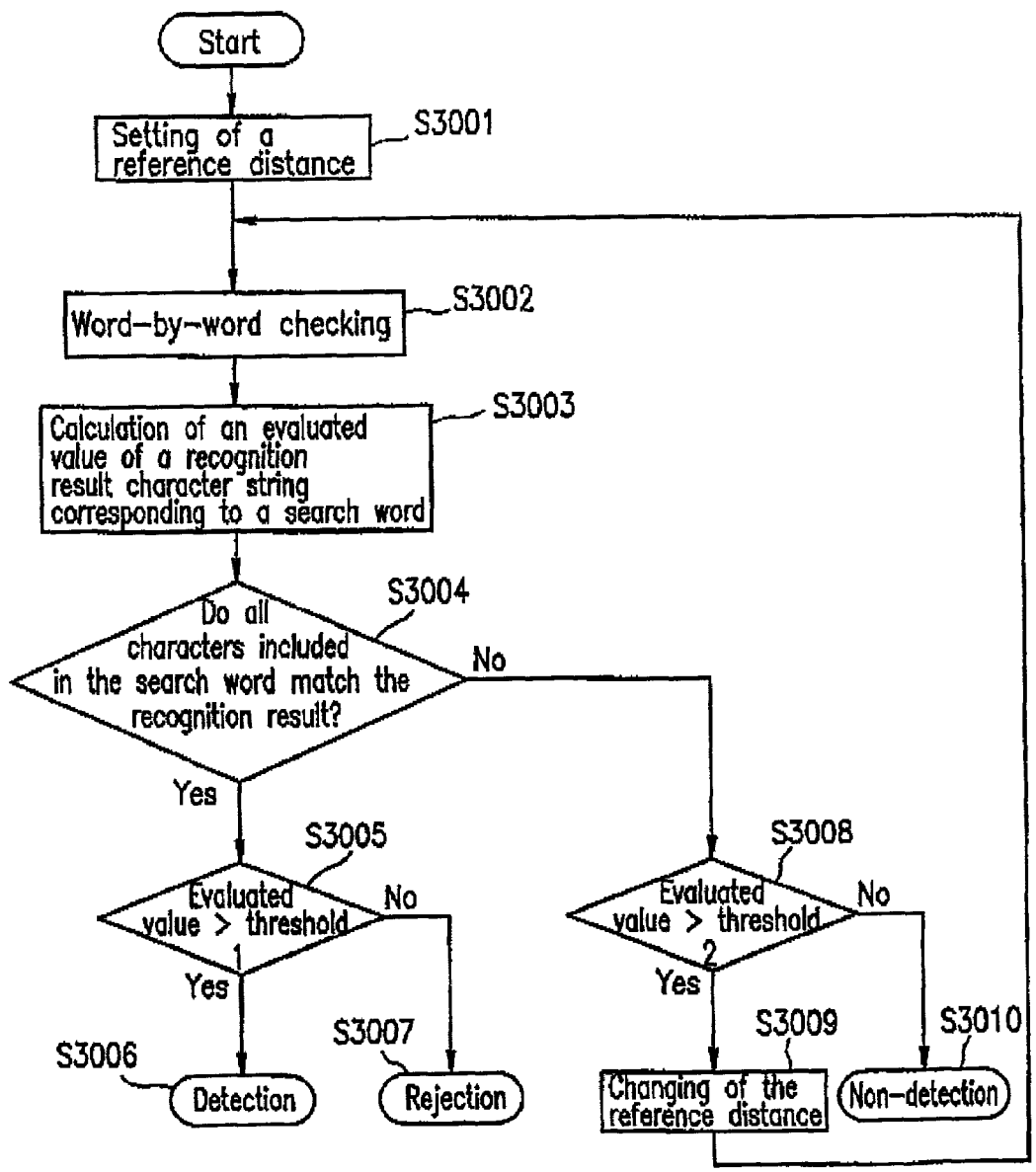
FIG. 30 is a flowchart showing the steps of a fuzzy retrieval process.

FIG. 30 shows the steps of a fuzzy retrieval process according to Example 13. This fuzzy retrieval process is executed by the CPU 110 in accordance with the document searching program.

Initially, a reference distance (initial value) to be compared with distances between character elements is predetermined (step S3001). This reference distance may be predetermined for each character included in a search word, or shared by the characters included in the search word.

Matching is performed on a word-by-word basis (step S3002). Based on a result of the matching, a character string in a recognition result corresponding to a search word is evaluated (step S3003). For example, as the evaluated value, Pw indicated by formula (1) or (2) can be used.

Thereafter, whether all characters included in the search word matches the recognition result is determined (step S3004).

When a result of the determination in step S3004 is "Yes", the evaluated value is compared with a predetermined threshold 1 (step S3005).

When the evaluated value is more than the predetermined threshold 1, it is determined that the search word is detected in the recognition result (step S3006).

When the evaluated value is lens than or equal to the predetermined threshold 1, the search result is rejected (step S3007). The reason the search result is rejected is to suppress detection error which is likely to occur when many characters are given a low reliability in the recognition result.

When a result of the determination in step S3004 is "No", the evaluated value is compared with a predetermined threshold 2 (step S3008).

When the evaluated value is more than the predetermined threshold 2, the reference distance is changed (step S3009). A character, which has not matched the recognition result, of the search word is subjected again to the word-by-word matching (step S3002). In step S3009, the reference distance is changed only for a character, which has not matched the recognition result, of the search word. It should be noted that the reference distance may be changed for all characters of the search word. Further, the reference distance may be changed to a constant value more than the initial value or a value varying depending on the evaluated value (a variable value more than the initial value).

When the evaluated value is less than or equal to the predetermined threshold 2, it is determined that the search word was not retrieved from the recognition result (step S3010).

It should be noted that a predetermined upper limit n is placed on the number of returns from step S3009 to step S3002. In this example, n=2. The reason the upper limit is provided is that once the evaluated value exceeds the predetermined threshold 2, the reference value is changed in step S3009 and the process returns to step S3002 until all characters included in the search word match the recognition result. In addition, when all characters included in the search word do not match the recognition result no matter how much the reference distance is increased, the process may fall into an endless loop. The provision of the upper limit n can prevent such an endless loop.

It should be noted that it is preferable to distinguish a way to display a probable search result from a way to display a non-probable result so as to clarify the probability of the search result. For examples a display method for the search result may be modified depending on the evaluated value.

It should be noted that the retrieval process described in Example 12 is the same as that described in Example 13 except for step S3001 of FIG. 30 and the case where a result of the determination in step S3008 is "Yes". In Example 12, when a result of the determination in step S3008 is "Yes", it is determined that the search word is detected in the recognition result. The retrieval process is then ended.

Example 14

Example 14 is a retrieval process obtained by modifying those described in Examples 12 and 13.

In the description below, a "character element" is simply referred to as a "character".

Figure 31:
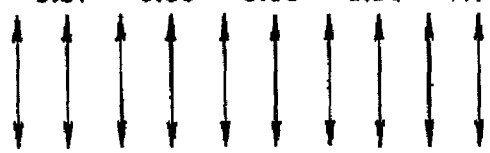
FIG. 31 is a diagram used for explaining a retrieval process for searching a recognition result for a search word.

Hereinafter, referring to FIG. 31, description will be given of a retrieval process in which a recognition result " . . . オッタスフォードO学生並. . . " obtained by subjecting an original document " . . . オックスフォードの学生達. . . " to character recognition is searched for a search word "·オックスフォード大学". In this case, the recognition result is stored as document data in the memory 140. The memory 140 may be any type of storage medium.

Each character in the recognition result is given a reliability indicating the probability of the recognition result (a probability of a correct result). Similar to Examples 12 and 13, the probability table of FIG. 27 is calculated prior to search.

In the search, initially, whether the search word "オックスフォード大学" can be divided into a plurality of words is determined. In this determination, a previously prepared word dictionary is used, for example. In this example, it is assumed that a word "オックスフォード" and a word "大学" are present in the previously prepared word dictionary. In this case, the search word "オックスフォード大学" is divided into two words, i.e., "オックスフォード" and "大学".

In search, document data is searched for a portion in which the search word "大学" follows the search word "·オックスフォード". A search for each search word is performed in a similar manner to that described in Examples 12 and 13.

If the search is performed without dividing the search word into two words, matches occur in eight characters in the word "オックスフォード大学" of ten characters at first, second, fourth, fifth, sixth, seventh, eighth, and tenth characters. Further, since Pa(10, 8) is typically a large value, detection error easily occurs, resulting in search noise. The search easily succeeds around other portions where the word "オックスフォード" exists, resulting in frequent search noise. Therefore, when a long search word is made of a plurality of words, the search word is divided into a plurality of words using a word dictionary or the like, thereby making it possible to reduce search noise.

It should be noted that a word dictionary preferably includes not only ordinary words but also character strings which tend to be shared by a plurality of words. For example, a word dictionary includes a character string "テーション" included in "プランテーション", "オリエンテーション", "ステーション", and the like. In search, the character strings are divided into "プラン" and "テーション", "オリエン" and "・テー ション・.", or "ス" and "テーション", respectively. By searching for the divided character strings, it is possible to prevent detection error that a different word sharing a part with a search word is detected.

INDUSTRIAL APPLICABILITY

According to the present invention, a distance which is relevant to a similarity between character elements is predetermined between character elements. Whether a character element included in a recognition result matches a character element included in a search keyword is determined based on a result of comparison of the distance between the character elements and a predetermined reference distance. By varying the predetermined reference distance depending on a reliability of a recognition result, it is possible to perform a search while dynamically changing a tolerance level to recognition error depending on the recognition result.

Further, distances between character elements are previously provided in the form of a table. Therefore, complicated calculation of distances is not required in the search. As a result, a high-speed search can be achieved.

Furthermore, for a specific character element, a plurality of character elements having the possibility of being concatenated with the specific character element are determined. Therefore, even when the layout of an original document is incorrectly recognized, a search keyword can be appropriately retrieved from a recognition result. As a result, even when it is incorrectly recognized whether the sentences of an original document in the form of vertical writing or horizontal writing, or a subsequent line to be concatenated after line feed is incorrectly recognized, a search keyword can be appropriately retrieved from a recognition result.

The invention claimed is:

1. A retrieval method for searching for a second character element string including a designated second character element from a first character element string including a first character element obtained by respectively character-recognizing each character of a character string, comprising:
    selecting a third character element from a predetermined third character elements with which a distance relevant to a similarity with the second character element is predetermined;
    wherein the third character element is selected when the distance with the character element of the designated second character element string is within a predetermined range with respect to a reference distance that is an acceptable value of the predetermined distance based on a reliability when character-recognizing the first character element and,
    determining that the first character element matches the second character element when the selected third character element matches the first character element.

2. A retrieval method according to claim 1, wherein for the first character element, a reliability of character recognition is predetermined, and
    a first predetermined reference distance is determined based on the reliability.

3. A retrieval method according to claim 2, wherein the predetermined first reference distance is determined based on user input.

4. A retrieval method according to claim 2, further comprising the steps of:
    changing the first predetermined reference distance to a second reference distance;
    comparing the distance with the second reference distance; and
    determining whether the second character element matches the first character element based on a result of the comparison of the distance with the second reference distance.

5. A retrieval method according to claim 1, wherein a plurality of distances relevant to the similarity between the first character element and the second character element are predetermined between the first character element and the second character element, and
    one distance selected from the plurality of distances is used as the distance.

6. A retrieval method according to claim 5, wherein the one of the plurality of distances is determined based on user input.

7. A retrieval method according to claim 1, wherein the distance has a probabilistic distribution.

8. A retrieval method comprising:
    for a specific character element of the plurality of character elements of a first character element string, a plurality of character elements having the possibility of being concatenated with the specific character element are predetermined,
    the retrieval method comprising the steps of:
    determining whether a character element string obtained by concatenating the specific character element of the plurality of character elements with one character element of the plurality of character elements, the one character elements being different from the specific character element, matches at least a part of the second character element string;
    selecting one character element from the plurality of character elements having the possibility of being concatenated with the specific character element; and
    determining whether a character element string obtained by concatenating the specific character element with the selected character element matches at least a part of the second character element string.

9. A retrieval method comprising the steps of:
    obtaining a probability that a search result matches a second character element string, based on the number of the second character elements, which is a searching keyword, included in the second character element string, and a number of the second character elements, which is a character recognition result including errors, matching corresponding first character elements out of the second character elements included in the second character element string and;
    determining the correctness of the search result based on the probability.

10. A retrieval method according to claim 9, wherein a distance relevant to a similarity between the first character element and the second character element is predetermined between the second character element and the corresponding first character element, and
    the retrieval method further comprising the steps of:
    comparing the distance with a predetermined reference distance; and determining whether the second character element matches the corresponding first character element based on a result of the comparison of the distance with the predetermined reference distance.

11. A retrieval method according to claim 10, further comprising the step of:
for a second character element out of the at least one second character element included in the second character element string, said second character element not matching a corresponding first character element included in the first character element string, after resetting a predetermined reference distance, determining whether said second character element matches the corresponding first character element using the reset predetermined reference distance.

12. A retrieval method according to claim 9, further comprising the step of:
dividing the second character element string into a plurality of character element portions.

13. A retrieval device for searching for a second character element string including a designated second character element from a first character element string including a first character element obtained by respectively character-recognizing each character of a character string, comprising:
means for selecting a third character element from a predetermined third character elements with which a distance relevant to a similarity with the second character element is predetermined;
wherein the third character element is selected when the distance with the character element of the designated second character element string is within a predetermined range with respect to a reference distance that is an acceptable value of the predetermined distance based on a reliability when character-recognizing the first character element and,
means for determining that the first character element matches the second character element when the selected third character element matches the first character element.

14. A retrieval device for searching a first character element string obtained by subjecting a character string to character recognition for a second character element string,
wherein the first character element string includes at least one first character element and the second character element string includes at least one second character element,
the retrieval device comprising:
means for obtaining a probability that a search result matches the second character element string, based on the number of the second character elements included in the second character element string, and a number of the second character elements matching the corresponding first character elements out of the second character elements included in the second character element string; and
means for determining the correctness of the search result based on the probability.

15. A computer readable recording medium in which a program for causing a computer to execute a retrieval process for searching for a second character element string including a designated second character element from a first character element string including a first character element obtained by respectively character-recognizing each character of a character string, comprising:
selecting a third character element from a predetermined third character elements with which a distance relevant to a similarity with the second character element is predetermined;
wherein the third character element is selected when the distance with the character element of the designated second character element string is within a predetermined range with respect to a reference distance that is an acceptable value of the predetermined distance based on a reliability when character-recognizing the first character element and,
determining that the first character element matches the second character element when the selected third character element matches the first character element.

16. A computer readable recording medium in which a program for causing a computer to execute a retrieval process for searching a first character element string obtained by subjecting a character string to character recognition for a second character element string is recorded,
wherein the first character element string includes at least one first character element and the second character element string includes at least one second character element,
the retrieval process comprising the steps of:
obtaining a probability that a search result matches the second character element string, based on the number of the second character elements included in the second character element string, and a number of the second character elements matching the corresponding first character elements out of the second character elements included in the second character element string; and
determining the correctness of the search result based on the probability.

* * * * *

UNITED STATES PATENT AND TRADEMARK OFFICE
CERTIFICATE OF CORRECTION

PATENT NO. : 7,130,487 B1 Page 1 of 1
APPLICATION NO. : 09/868554
DATED : October 31, 2006
INVENTOR(S) : Taro Imagawa et al.

It is certified that error appears in the above-identified patent and that said Letters Patent is hereby corrected as shown below:

On the title page item (54) and col. 1, line 1, should read: --RETRIEVAL METHOD, RETRIEVAL DEVICE, AND RECORDING MEDIUM--

Signed and Sealed this

Third Day of April, 2007

JON W. DUDAS
*Director of the United States Patent and Trademark Office*